United States Patent
Siegel et al.

(10) Patent No.: US 9,246,950 B2
(45) Date of Patent: *Jan. 26, 2016

(54) SYSTEM AND METHOD OF PROVIDING REGISTRATION MACROS IN AN IMS NETWORK-BASED DEVICE

(75) Inventors: Steven A. Siegel, Mendham, NJ (US); Siroos K. Afshar, Englishtown, NJ (US); Leopold Strahs, Williamsburg, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1431 days.

This patent is subject to a terminal disclaimer.

(21) Appl. No.: 12/019,073

(22) Filed: Jan. 24, 2008

(65) Prior Publication Data

US 2009/0191867 A1  Jul. 30, 2009

(51) Int. Cl.
*H04L 29/06* (2006.01)
*H04W 60/04* (2009.01)
*H04W 8/02* (2009.01)

(52) U.S. Cl.
CPC ........ *H04L 65/1016* (2013.01); *H04L 65/1073* (2013.01); *H04W 8/02* (2013.01); *H04W 60/04* (2013.01)

(58) Field of Classification Search
CPC . H04L 65/1016; H04L 65/1073; H04L 67/18; H04W 4/02; H04W 8/02; H04W 60/00; H04W 60/04; H04W 60/06; H04W 64/00
USPC .......................... 455/435.1–435.2, 417–420, 455/151.1–151.4
See application file for complete search history.

(56) References Cited

U.S. PATENT DOCUMENTS

| | | | |
|---|---|---|---|
| 4,413,158 A | 11/1983 | Danford | |
| 5,724,417 A | 3/1998 | Bartholomew et al. | |
| 5,825,864 A | 10/1998 | McGraw et al. | |
| 8,665,862 B1 | 3/2014 | Stegall | |
| 2001/0010079 A1* | 7/2001 | Park | H04L 29/06 726/12 |
| 2004/0205212 A1 | 10/2004 | Huotari et al. | |
| 2004/0230697 A1* | 11/2004 | Kiss et al. | 709/245 |
| 2004/0242227 A1 | 12/2004 | Huotari et al. | |
| 2005/0009520 A1 | 1/2005 | Herrero et al. | |
| 2005/0044212 A1 | 2/2005 | Lingafelt et al. | |
| 2005/0215242 A1 | 9/2005 | Black et al. | |
| 2006/0133356 A1 | 6/2006 | Suzukawa | |
| 2006/0294244 A1* | 12/2006 | Naqvi et al. | 709/227 |
| 2007/0042789 A1* | 2/2007 | Moton et al. | 455/456.1 |
| 2007/0060174 A1 | 3/2007 | Newton et al. | |
| 2007/0077920 A1* | 4/2007 | Weeks et al. | 455/414.1 |
| 2007/0232272 A1* | 10/2007 | Gonsalves et al. | 455/412.1 |
| 2007/0238444 A1 | 10/2007 | Bunn et al. | |

(Continued)

OTHER PUBLICATIONS

"Session Initiation Protocol (SIP) Public Switched Telephone Network (PSTN) Call Flows," RFC 3666, Dec. 2003, A. Johnston, et al.

*Primary Examiner* — Michael Mapa

(57) ABSTRACT

Disclosed are a network-based device, method and computer-readable medium for providing registration macros in an IP multimedia subsystem (IMS). The method embodiment includes receiving an instruction from a user regarding a plurality of registration changes of customer Public User Identities at one or several pieces of equipment and implementing a macro such that the first step comprising at least one of a registration or de-registration and a second step comprising one of a registration or a de-registration both occur based on the instruction from the user.

20 Claims, 22 Drawing Sheets

(56) References Cited

U.S. PATENT DOCUMENTS

| | | |
|---|---|---|
| 2008/0056235 A1 | 3/2008 | Albina et al. |
| 2008/0108348 A1 | 5/2008 | Kottilingal et al. |
| 2008/0214100 A1 | 9/2008 | Walker et al. |
| 2009/0098853 A1 | 4/2009 | Mutikainen et al. |
| 2009/0116447 A1 | 5/2009 | Balasubramanian et al. |
| 2009/0157799 A1* | 6/2009 | Sukumaran ............ G06Q 10/10 709/203 |
| 2010/0008352 A1 | 1/2010 | Przybysz et al. |
| 2010/0177769 A1 | 7/2010 | Barriga et al. |
| 2010/0232422 A1 | 9/2010 | Blanco et al. |
| 2012/0219127 A1 | 8/2012 | Lu et al. |

\* cited by examiner

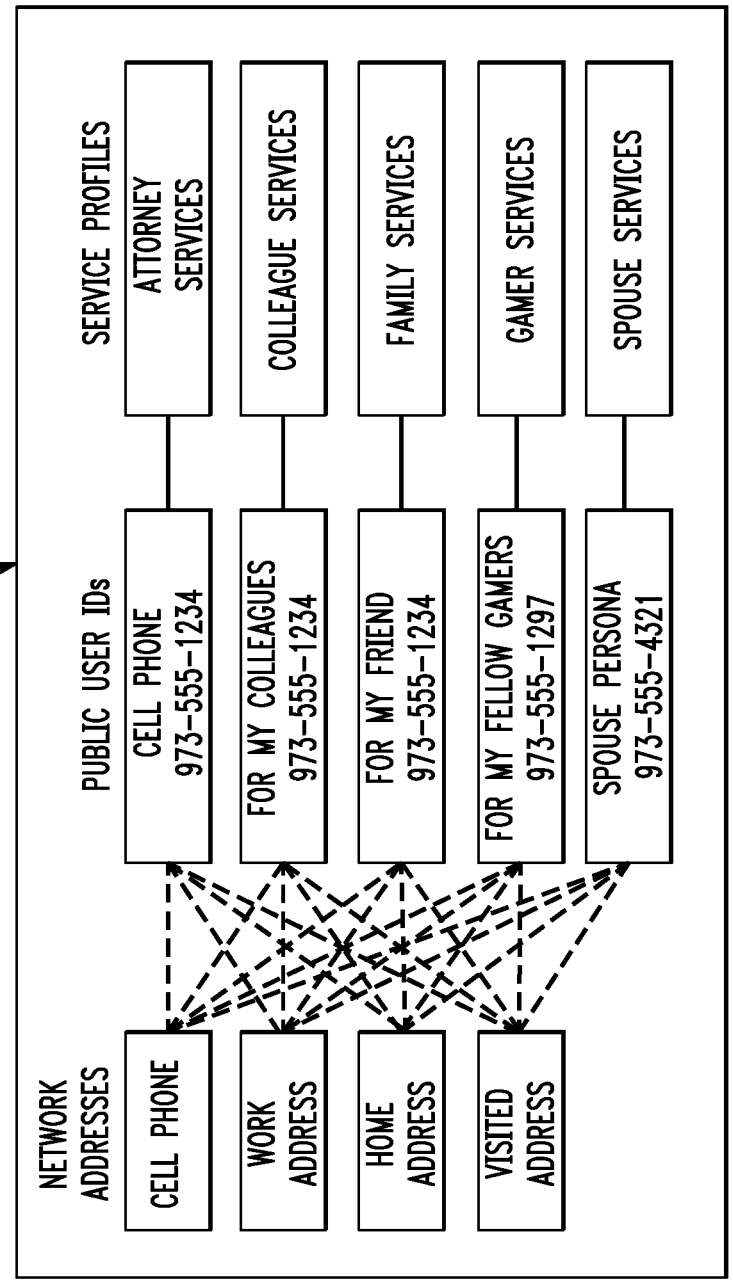

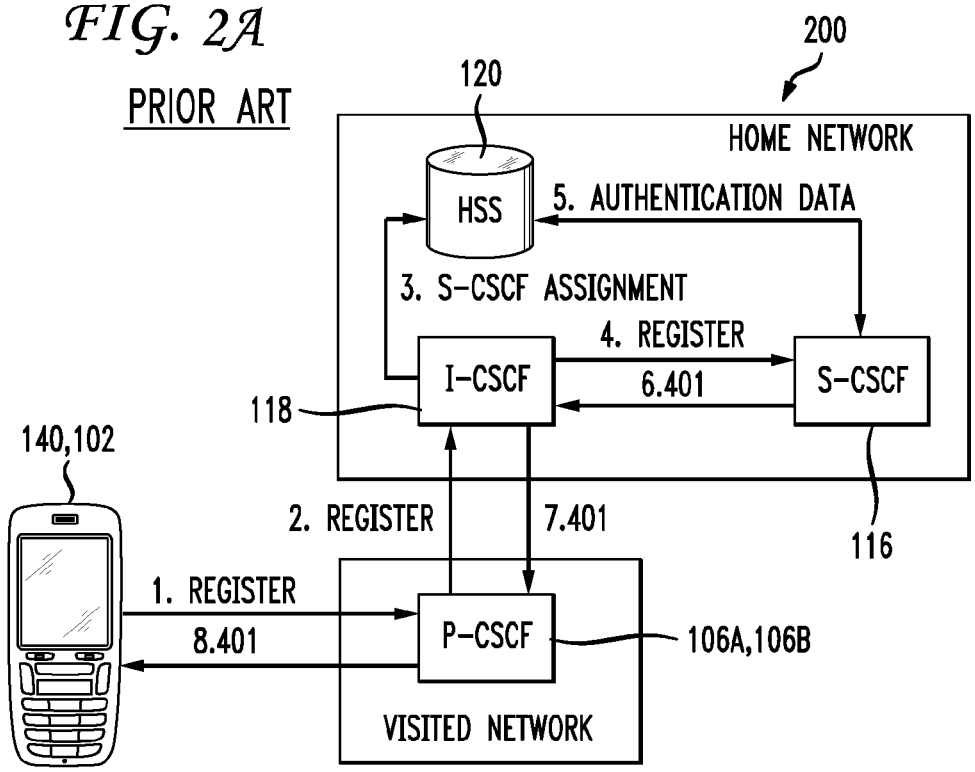
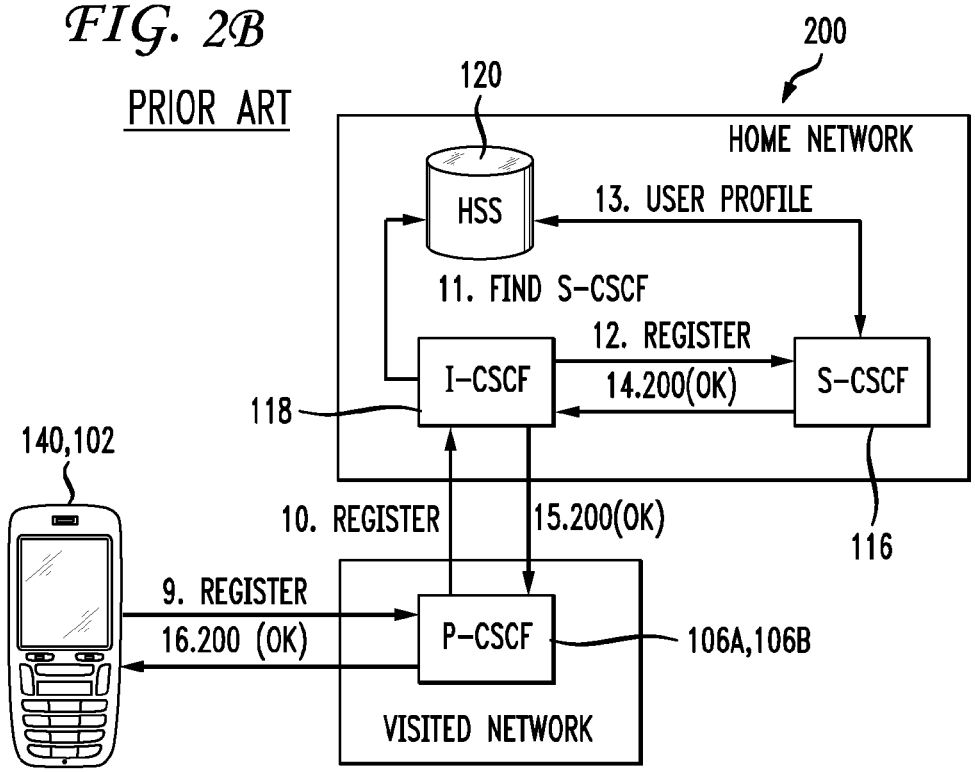

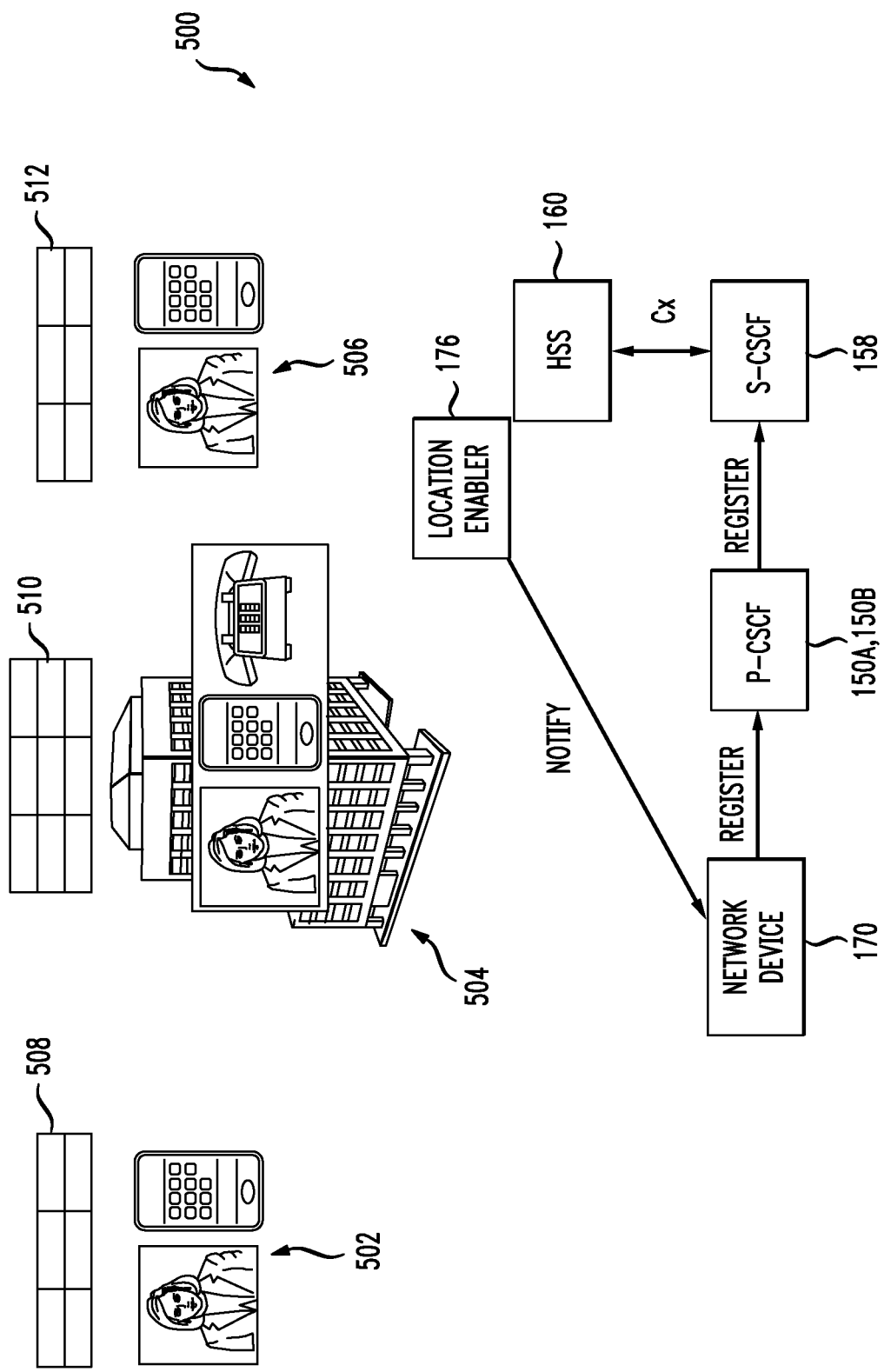

*FIG. 9*

| PUBLIC USER IDENTITY | CONTACT HEADER | P-CSCF |
|---|---|---|
| sip:steven.siegel@att.net | sip:[192.168.44.202]:122 | [144.132.244.165]:12 |

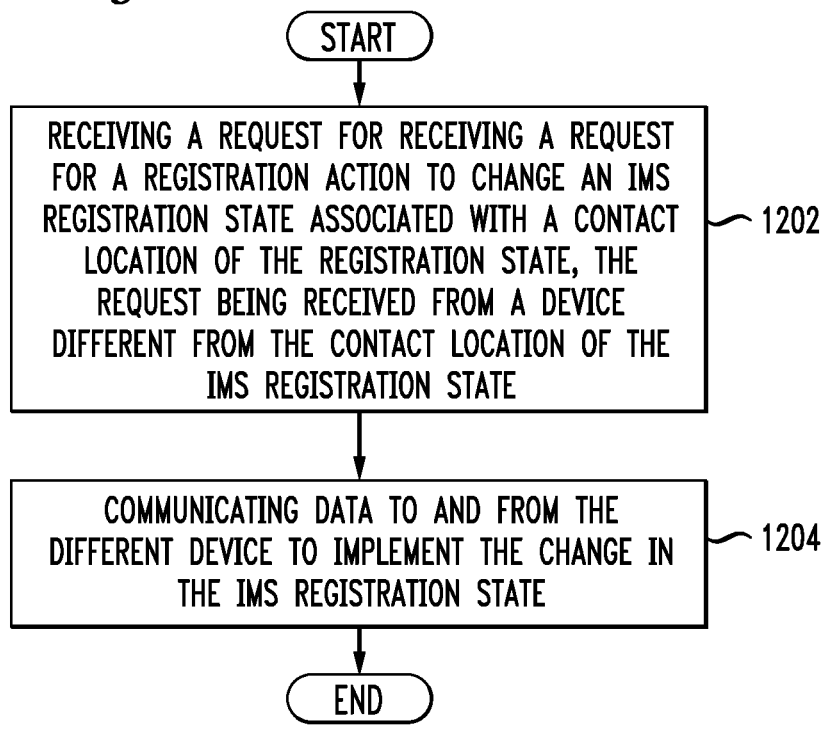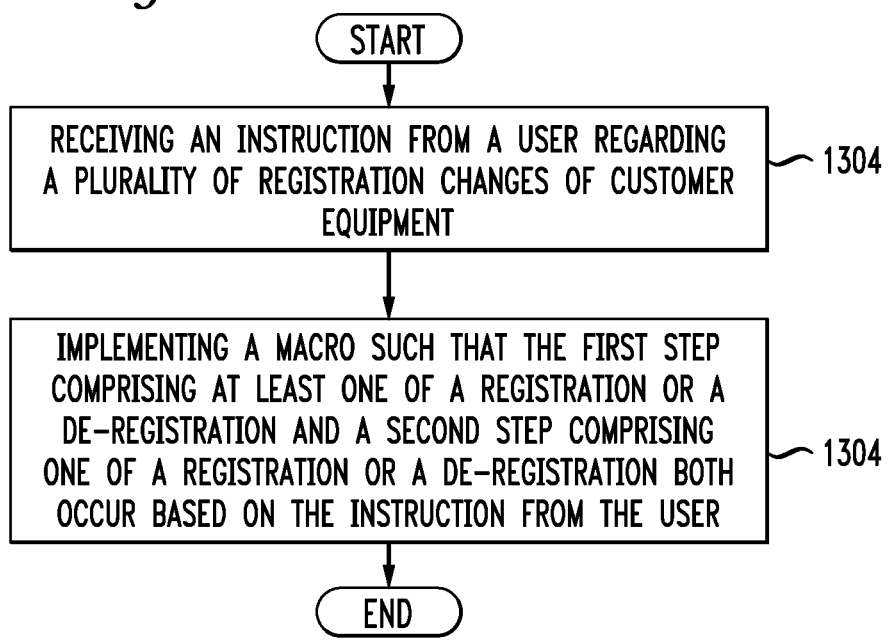

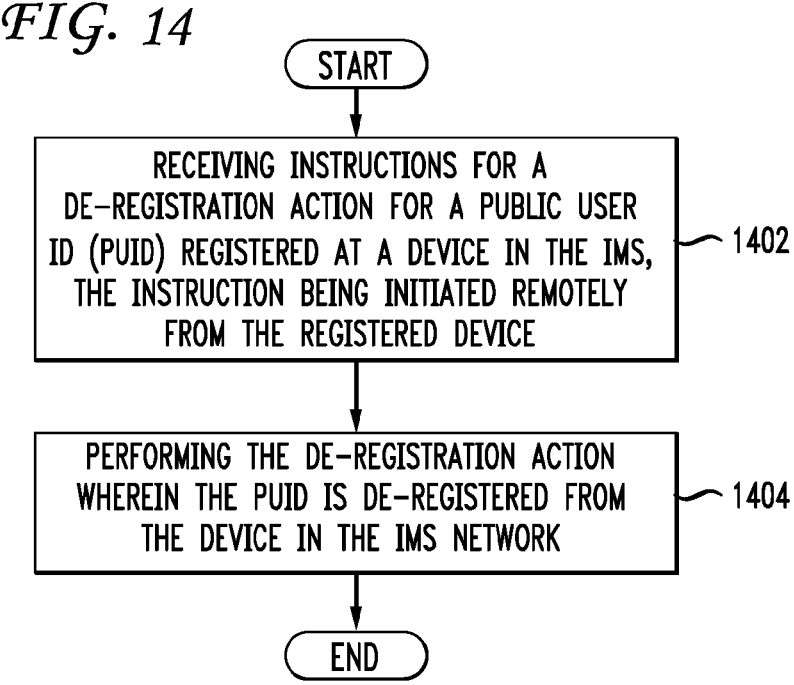
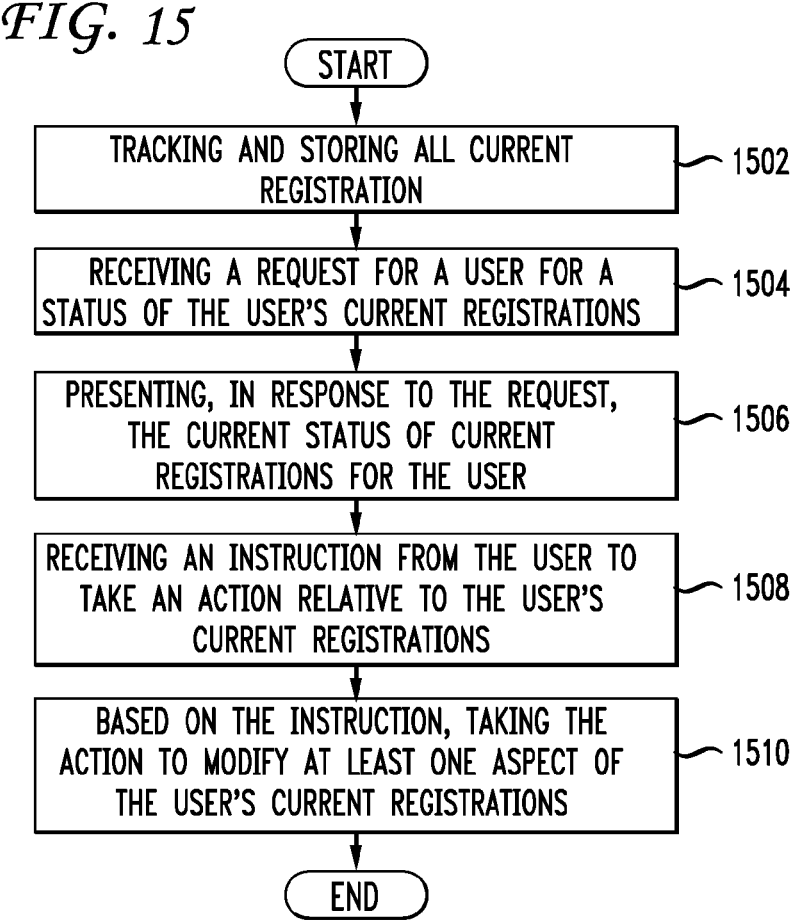

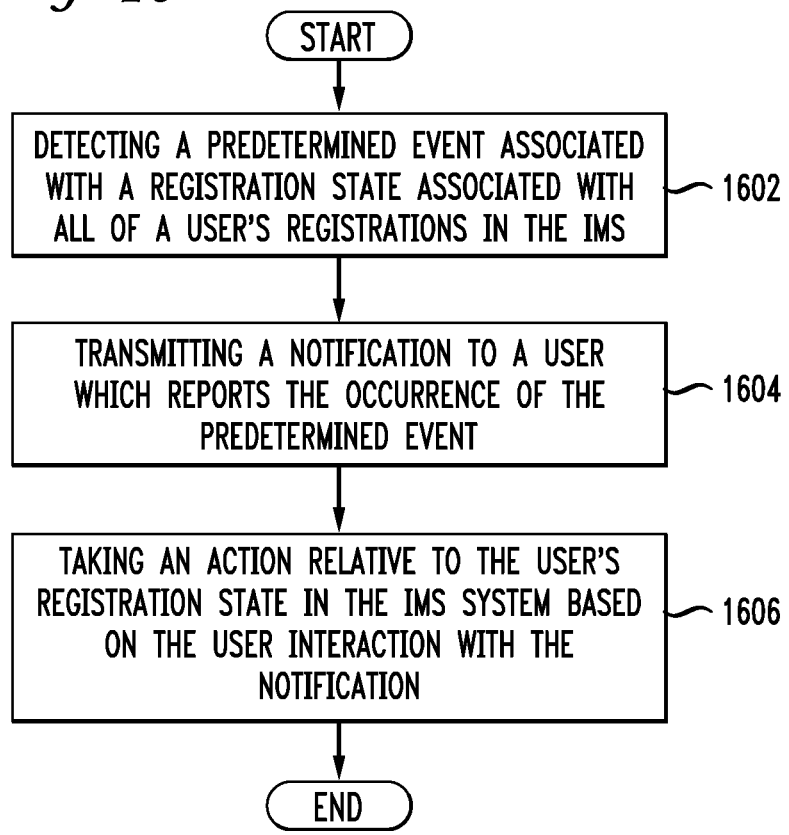

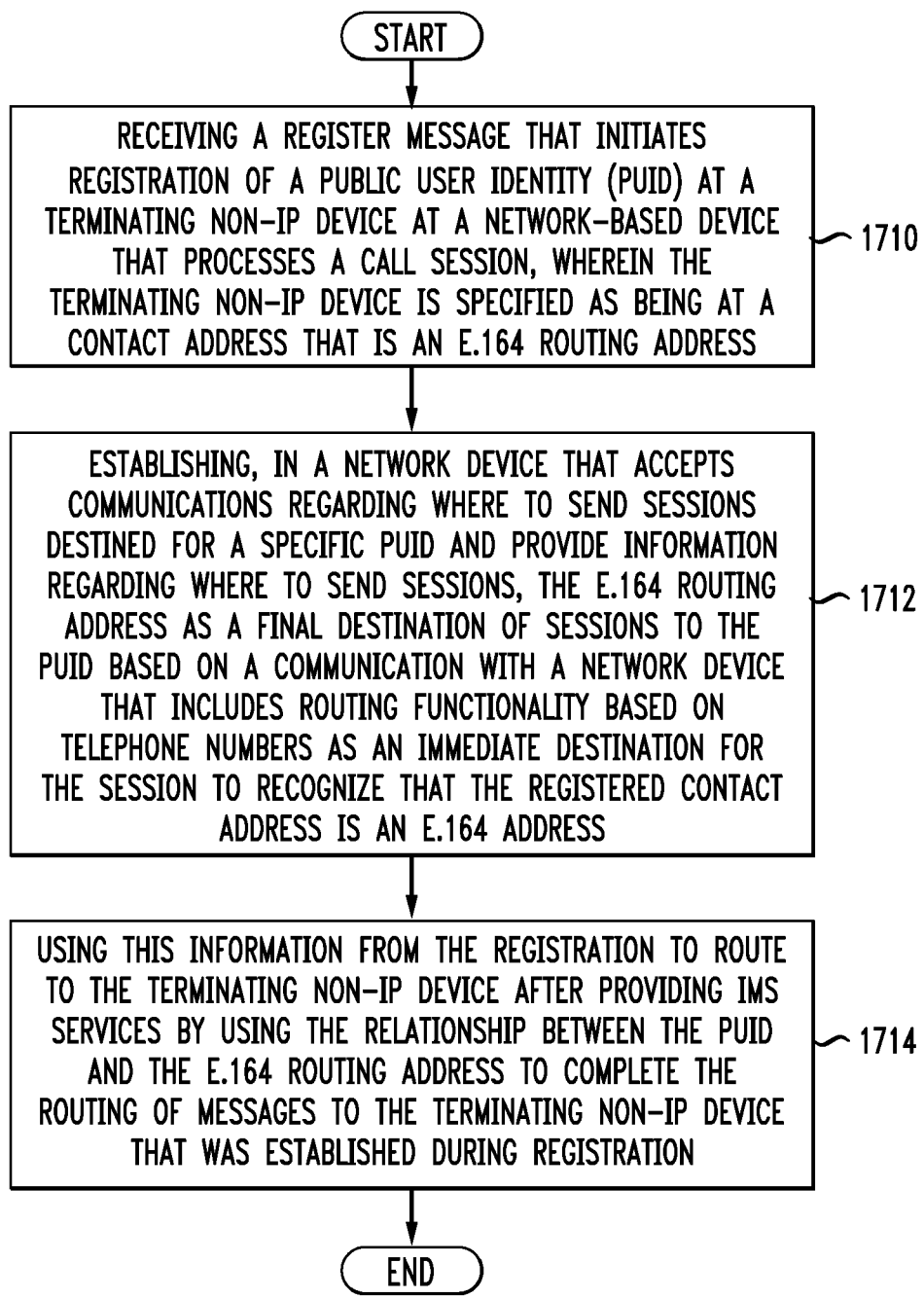

SYSTEM AND METHOD OF PROVIDING REGISTRATION MACROS IN AN IMS NETWORK-BASED DEVICE

RELATED APPLICATIONS

The present application is related to U.S. patent application Ser. Nos. 12/019,064; 12/019,085; 12/019,102; 12/019,118, now U.S. Pat. No. 8,134,956; Ser. No. 12/019,136, now U.S. Pat. No. 8,472,431; and Ser. No. 12/019,152, now U.S. Pat. No. 8,948,752, all filed on Jan. 24, 2008, the contents of which are incorporated herein by reference in their entirety.

BACKGROUND OF THE INVENTION

1. Field of the Invention

The present invention relates the IP Multimedia Subsystem (IMS) and more specifically to systems and methods of managing user registrations and portability of services within these systems.

2. Introduction

The IMS (IP Multimedia Subsystem) is technology that merges the internet with the cellular world. It makes internet technology such as the web, email, instant messaging, user presence, video conferencing and so forth available in nearly any location. The IMS is a key element in third generation (3G) architecture that makes it possible to provide ubiquitous sailor access to all services that the internet provides. For example, it enables one to access their favorite web pages, read their email, watch a movie or take part in the video conference wherever one is by simply using a mobile device and accessing the desired services. There are several references with which it is assumed that the reader is familiar as background for the present disclosure related to the IMS. Accordingly, further details provided herein may be found in the 3G IP Multimedia Subsystem (IMS), Merging the Internet and Cellular Worlds, by Gonzalo Camarillo and Miguel A. Garcia-Martin, John Wiley and Sons Ltd., 2006 and the IMS, IP Multimedia Concepts and Services, by Poikselka, Mayer, Khaitabil and Niemi, John Wiley and Sons Ltd., 2006. A brief introduction shall be provided while further details may be found in these references.

The IMS aims to combine the latest trends in packet switch technology and circuit switch technology to make a mobile internet available. It also aims to create a common platform to develop various multimedia services and to create a mechanism to boost margins for service providers due to extra usage of mobile packet switch networks. There are various protocols used in the IMS which include the session control protocol, and a session initiation protocol (SIP) as well as other protocols known to those of skill in the art that are utilized for providing the multimedia services. The IMS architecture is a collection of functions linked by standardized interfaces. Most venders follow the IMS architecture closely and implement each function in a single node although other nodes may be used.

FIG. 1 illustrates the basic IMS architecture 100. This is the architecture as standardized by 3GPP, which is the third generation partnership project that was charted to develop specifications for the evolution of GSM, which is the global system for mobile communication which is one of the most popular standards for mobile phones. FIG. 1 illustrates most of the signaling interfaces using the IMS which are typically referred to by a two or three letter code. This is only a partial list of the potential interfaces. IMS mobile terminal 140 communicates with a packet network 136 such as the GPRS network or other networks, through a radio link 138. The IMS also supports other types of devices and accesses as well. Personal digital assistants (PDAs) and computers 102 are examples of devices that can connect to the IMS through alternative accesses such as the public Internet, WLAN or ADSL 104. Other nodes are also shown as part of the IP multimedia core network subsystem. These nodes include one or more user databases typically called home subscriber services (HSSs) 120 and subscriber location functions (SLFs) 122. One or more SIP servers are shown which are collectively known as call/session control functions (CSCFs) 116, 118. One or more application servers are shown such as a SIP application server 108. One or more media resource functions (MRFs) are shown 126, 128 which may further be divided into media resource function controllers (MRFCs) 126 and media resource function processors (MRFPs) 128. There may be one or more breakout gateway control functions (BGCFs) 124 which is essentially an SIP server that includes routing functionality based on telephone numbers. The BGCF 124 is typically only used in sessions that are initiated in an IMS terminal and addressed to a user in a circuit switch network such as a PSTN or the PLMN. The main functionality of the BGCF 124 is to select an appropriate network for interworking with the circuit-switch domain is to occur or to select an appropriate PSTN/CS (circuit-switch) gateway, if interworking it so occur in the same network where the BGCF is located.

Also shown in FIG. 1 is one or more PSTN gateways, each one decomposed into a signaling gateway press (SGW) 130, a media gateway controller function (MGCF) 132 and a media gateway (MGW) 134. The HSS 120 is a central repository for user-related information. It is understood that the HSS 120 is an evolution of the home location register (HLR) which is a GSM node. The HSS 120 contains all the user related subscription data requires to handle multimedia sessions. The data can include among other items, location information, security information, authorization information, authentication information, user profile information, which may include the services that the user has subscribed to and the serving-CSCF (S-CSCF) 116 allocated to the user. The CSCFs which are typically SIP servers, are important nodes in the IMS. The CSCF processes SIP signaling in the IMS. Shown in FIG. 1 are three types of CSCFs that depend on the functionality they provide. The proxy-CSCF (P-CSCF) 106A is typically a first point of contact in a signaling plane between the IMS terminal 140, 102 and the IMS network 100. From the point of view of the SIP protocol, the P-CSCF 106A, 106B acts as an inbound/outbound SIP proxy server. This means that all requests initiated by the IMS terminal 102, 140 or destine for the IMS terminal 102-140 traverse the P-CSCF 106A, 106B. The P-CSCF forwards SIP requests and responses to the appropriate direction, such as toward the IMS terminal 102, 140 or toward the IMS network 100. The P-CSCF 106A, 106B is allocated to the IMS terminal during IMS registration and does not change for the duration of the registration which typically means that the IMS terminal communicates with a single P-CSCF during the registration. The P-CSCF includes several functions which may be related to security. For example, it may establish a number of IP SEC security associations toward the IMS terminal 102, 140. These IP SEC security associations offer integration protection which is the ability to detect whether the contents of the message have been changed since its creation. Once the P-CSCF authenticates the user, the P-C SCF asserts the identity of the user to the rest of the nodes in the network. In this way, other nodes do not need to further authenticate the user because they trust the P-CSCF and the rest of the nodes in the network user's identity have a number of purposes such as providing personalized services and generating account records. The P-CSCF also verifies the correctness SIP request sent by the IMS terminal 102, 140. This verification keeps the IMS terminals from creating SIP requests that are not built according to the SIP rules. Each P-C SCF serves a number of IMS terminals depending on the capacity of the node. Further details regarding the P-CSCF are known to those of skill in the art.

Next, an interrogating CSCF (I-CSCF) 118 may also be used in the network 100. This is a SIP proxy located typically at the edge of an administrative domain. A serving-CSCF (S-CSCF) 116 is a central node of the signaling. This node is essentially a SIP server but performs session control as well. In addition to SIP server functionality, the S-CSCF 116 also acts as a SIP registrar. This means that it maintains a binding between the user location, which is the IP address of the terminal the user is logged on, and the user's SIP address of record which is also known as a public user identity (PUID). The S-CSCF 116 also implements a diameter interface to the HSS 120 for the purpose of downloading authentication vectors of the user that trying to access the IMS from HSS. The S-CSCF uses these vectors to authenticate the user. The S-CSCF may download a user profile from the HSS 120. The user profile includes the service profile and a set of triggers that may cause a SIP message to be routed through one or more application servers. The interface may also inform the HSS 120 that this is the S-CSCF 116 allocated to the user for the duration of the registration.

The SIP-AS 108 is a native application server that hosts and executes IP multimedia services based on SIP. The open service access-service capability server (OSA-SCS) 110 is an application server that provides an interface to the OSA framework application server. It inherits all the OSA capabilities and especially the capability to access the IMS securely from external network. The node acts as an application server on one side and is the interface between the OSA application server and the OSA application programming interface on the other side. The IP multimedia services switching function (IM-SSF) 112 is a specialized application server that allows the system to use customized applications for mobile network enhanced logic (CAMEL) services that were developed for GSM in the IMS. The details on these various nodes are known to those of skill in the art.

The signaling gateway (SGW) 130 interfaces the signaling plane of the CS network, such as the PSTN. The SGW 130 performs lower layer protocol conversion such as being responsible for replacing the lower MTP transport with a stream control transmission protocol (SCTP) over IP. The media gateway control function (MGCF) 132 is a central node of the PSTN/SC gateway and implements a state machine that does protocol conversion and maps SIP to either ISUP over IP or VICC over IP which are control protocols in circuit switch networks. The media gateway (MGW) 134 interfaces the media plane of the PSTN or CS network. On the one side, the MGW 134 is able to send and receive IMS media over the real time protocol (RTP). On the other side, the MGW 134 uses one or more pulse code modulation time slots to connect to the CS network. The MGW 134 may also perform transcoding when the IMS terminal 140, 102 does not support the codec used on the CSI.

Many other basic aspects of the IMS architecture may be found in Camarillo et al., Chapter 3. With this basic introduction in mind, we now focus on the IMS registration process which includes a number of deficiencies.

Prior to IMS registration, the user equipment (UE) 102 must discover the IMS entity to which it will send a register request. This concept is called a proxy-call session control function. This is called P-CSCF discovery and is described in Section 3.8 of Poikselka et al. In addition, before the registration process, the ULE 102 needs to fetch user identities from identity modules. An S-CSCF will be assigned, authentication will be formed and its corresponding security associations will be established. A user profile will be downloaded from the HSS 120 to the assigned S-CSCF 116 and SIP compression will be initialized and implicitly registered PUIDs will be delivered. The IMS registration process contains basically two phases. The first phase is shown in FIG. 2A which involves how the network challenges the UE 102. FIG. 2B illustrates the second phase which is how the UE 102 responds to the challenge and completes a registration.

First, as shown in FIG. 2A, the UE 102 sends a SIP register request to the discovered P-CSCF 106A. This request may contain an identity to be registered in a home domain name or an address of the interrogating-CSCF (I-CSCF) 118. The P-CSCF 106A processes the register request and uses the provided home domain name to resolve the IP address of the I-CSCF 118. The I-CSCF in turn will contact the HSS 120 to fetch the required capabilities for the S-CSCF 116 selection. After HSS 120 selects the S-CSCF 116, the I-CSCF 118 forwards the register request to the S-CSCF 116. The S-CSCF 116 realizes that the user is not authorized and therefore retrieves authentication data from the HSS 120 and challenges the user with a 401 unauthorized response.

Second, the UE 102 will calculate a response to the challenge and send another register request to the P-CSCF 106A. This is shown in FIG. 2B. Again, the P-CSCF 106A finds the I-CSCF 118, and in turn, finds the S-CSCF 116. The S-CSCF then checks the response and, if it is correct, downloads a user profile from the HSS 120 and accepts the registration with a 200 OK response. Once the UE 102 is successfully authorized, the UE is able to initiate and receive sessions. During the registration procedure, both the UE 102 and the P-CSCF 106A learn which S-CSCF 116 in the network will be serving the UE 102. Table 1 illustrates the information storage before, during and after the registration process.

TABLE 1

| Node | Before Registration | During Registration | After Registration |
| --- | --- | --- | --- |
| UE | P-CSCF address, home domain name, credentials, public user identity, private user identify | P-CSCF address, home domain name, credentials, public user identity, private user identity, security association | P-CSCF address, home domain name, credentials, public user identity (and implicitly registered public user identities), private user identity, security association, service route information (S-CSCF) |

TABLE 1-continued

| Node | Before Registration | During Registration | After Registration |
|---|---|---|---|
| P-CSCF | No state information | Initial network entry point, UE IP address, public and private user IDs, security association | Final network entry point (S-CSCF), UE address, registered public user identity (and implicitly registered public user identities), private user ID, security association, address of CDF |
| I-CSCF | HSS or SLF address | HSS or SLF entry, P-CSCF address, S-CSCF address | HSS or SLF address |
| S-CSCF | HSS or SLF address | HSS address/name, user profile (limited - as per network scenario), proxy address/name, public/private user ID, UE IP address | HSS address/name, user profile (limited - as per network scenario), proxy address/name, public/private user ID, UE IP address |
| HSS | User profile, S-CSCF selection parameters | User profile, S-CSCF selection parameters, visited network information if user is roaming | User profile, S-CSCF selection parameters, information about which user identities are registered, name of the S-CSCF allocated to the user |

It is the UE's 102 responsibility to keep its registration active by periodically refreshing its registration. If the UE 102 does not refresh its registration, then the S-CSCF 116 may silently remove the registration when the registration time lapses. When the UE 102 wants to de-register from the IMS, it sets a registration timer to 0 and sends a registered request. Poikselka et al. Sections 10.5 and 10.14, incorporated herein by reference as background material, provide further details regarding IMS registration and de-registration.

The basic IMS registration process is insufficient to meet customer needs in support of service mobility and a user-centered network. There are several aspects of the basic IMS approach that are problematic. First, all registrations and de-registrations must come from the contact address at which the PUID is being registered or de-registered. This can be problematic because the user may not have the device in question or a legacy device may not be able to originate the registration. Further, registrations may expire without intervention.

The use of the Private User Identify as part of the authentication process for registrations introduces difficulty in service mobility. The Private User Identify represents both the equipment and the user. This works well for single user devices such as cell phones, but creates unaddressed issues for shared devices and for users who want services on devices that they are using temporarily, such as hotel phones or visitors office phones. Further, there is no support for event-driven registration and de-registration except based on registration expiration. Yet another issue in the IMS registration process is that it assumes that all equipment will be capable of self-registration. For users that are mobile between devices, registrations and de-registrations will become common place.

Another problem arises when a customer decides that he or she wants to stop receiving calls from a device after having already left it. For example, a business women waiting for an important business call may leave children with a babysitter and go out for the evening. After she has left, while she may be able to register her business persona on her cell phone, she may not be able to de-register from the phone using the basic IMS registration approach which may still maintain the registration. This could result in a child or a babysitter answering an awaited call from a business associate.

Single-point management of registrations also would be difficult. While it would be possible to request a network service to give information on where a PUID was registered, the requirement that registration and de-registration be done from the device itself forces any registration manager to rely on accessing capabilities within the device to change registrations. Accordingly, what is needed in the art is an approved system and method of managing the registration process within an IMS context to enable improved user flexibility in receiving IMS services.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

There are a number of solutions to the above-identified issues with regards to managing registrations in an IMS context. A network-based node, which may or may not be termed a registration manager, may act as a proxy for the user equipment performing proxy registrations and de-registrations without using the actual device.

Requiring private user identities that are dedicated to a specific user (multiple public user PUIDs may be supported) to be resident on the device limits the possibilities for new users to register on a device that is not pre-provisioned for that user. This is not a problem for dedicated personal devices that are always used by one user. However, it does become a problem for shared or visited devices. Examples of these include home phones, shared store, office or work phones or visitor's offices and so forth. A network registration server that performs registration as a proxy for the user could have access to user-specific private user identities to be used after authenticating the user. Another area of limitation is in the area of network-initiated registrations or de-registrations. These might be event driven. They could happen at designated times of the day, when a user's location has changed or when a change has been made in the presence or location information about a user. <Typically, location and presence are distinct concepts.> With the basic IMS system, any changes in registration status would have to involve a register message coming from the user equipment as shown above.

There is also the issue of user equipment that is not capable of registering and de-registering itself. Examples of such user equipment include non-SIP VOIP phones and phones behind line access gateways. This equipment will not have universal integrated circuit cards (UICC, a chip card used in wireless cards to register) and will not be able to register and de-register PUIDs, especially if it is shared equipment. GSM phones are in a similar category. The ability to register and de-register PUIDs independent of each other is not well supported by current standards. Some SIP equipment without UICCs may also be on carriers' networks.

These deficiencies stem from the initial needs of IMS. The first implementers of IMS were the wireless service provides that believed in the concept of a personal all-purpose wireless device. They initially determined that their customers would have exactly one device per user and that this device would not be shared. Service mobility was not necessary because they had device mobility in only a single device. Other devices were provided by other service providers. Therefore, they wish that their customers could abandon all of the services and the other devices were certainly not part of their concept of IMS. However, there are providers with more expansive needs and customers that user a variety of devices, both wired and wireless. Many have multiple devices that span the home, office, cell and video. People are mobile between devices and sometimes use one device and sometimes another. Many of the devices are shared such as a home phone. Frequently, users want telecommunication services at a device with which they have no previous relationship such as a neighbor's phone, a hotel phone, air phone and so forth. All of these issues are addressed by the present invention which provides a network based node or nodes with a web interface and capable of performing proxy registrations and de-registrations.

The present invention provides a network node, server or device that makes registration, de-registration and the management of registration possible and easy for customers in a variety of environments at which they would like to get their PUID-based services. The network device may be characterized as a network device but the ideas are described herein based on functionality rather than particular hardware configuration. The network device disclosed herein addresses a number of deficiencies in the standard IMS registration process. Each of these deficiencies is disclosed as a separate embodiment of the invention and addresses various issues. For example, one embodiment shall provide a system and method of registering at non-compatible IMS devices such as POTS phones. Another embodiment provides a system and method of using registration macros and an IMS registration system which make possible macros such as a "move" macro that is a combination of registration at one location and de-registration at another or a macro which can return the user to a defined registration state for one or more public user identities such as a default state at night or while the user is at the office.

Another embodiment relates to a remote de-registration process which is an improvement on the IMS specifications (which force the de-registration to come from the location being de-registered). The network device or registration manager of this embodiment enables remote de-registration of a device.

Yet another embodiment relates to a system and method providing automated registration changes in an IMS registration system. In this regard, the network may automatically change registration states, for example, one registration configuration might apply during work hours, another outside of work hours.

Another embodiment enables a mechanism for a user to check current registrations via a registration review process which is not currently available in the IMS registration system.

Yet another embodiment relates to registration alerts and provides via the network device the ability to receive an alert in a situation, for example, wherein a device is registered at an unusual address for a defined period of time or when not registered at the usual address for a defined period of time. For example, the network device may provide an alert to a user if the user does not register at a home address for 24 or 48 hours. The IMS network device may determine these states and alert the user appropriately using notification mechanisms such as phone, instant messaging, email and so forth.

Yet another embodiment of the invention relates to support for users in circuit switch (CS) networks and specifically support for IMS customers. A benefit provided in this aspect is service portability where an IMS user may receive his or her IMS services whether the device is being used as an IP device, cell phone or a circuit switch phone. The portability aspect means that the same services and same bill accounting will be available on any device. An example, all of one's work services including abbreviated dialing, special access means and separate accounting would be available to the PUID associated with the user at work whether they were actually working at the office on an office phone, virtual office on a home phone, in transit on a cell phone or visiting on another's device. Therefore, a user is able to get IMS services from any visiting PSTN or non-IP phone for both originating and terminating services. Because of the different approaches, one embodiment relates to handling IMS for an originating non-IP device and another embodiment relates to providing IMS services to a non-IP terminating device.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 1D illustrates a user-centric network paradigm;

FIG. 2A illustrates the basic architecture for registering a device according to the IMS procedure;

FIG. 2B illustrates the basic architecture for registering a device according to the IMS procedure;

FIG. 5 illustrates another example of a location-based registration;

FIG. 9 represents a simplified view of the association of a PUID with a contact address and P-CSCF in the SIP Registrar;

FIG. 12 illustrates a method embodiment for registering users at an IP multimedia sub-system using a network-based device;

FIG. 13 illustrates a method embodiment of providing registration macros for an IMS registration system;

FIG. 14 illustrates a method embodiment of remotely de-registering devices using the IMS network device;

FIG. 15 illustrates a method of providing the user with the ability to review registrations using the IMS network device;

FIG. 16 illustrates a method of providing registration alerts from the IMS network device;

FIG. 17B illustrates another embodiment of operating an IMS to provide IMS services to terminating non-IP devices.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 3:
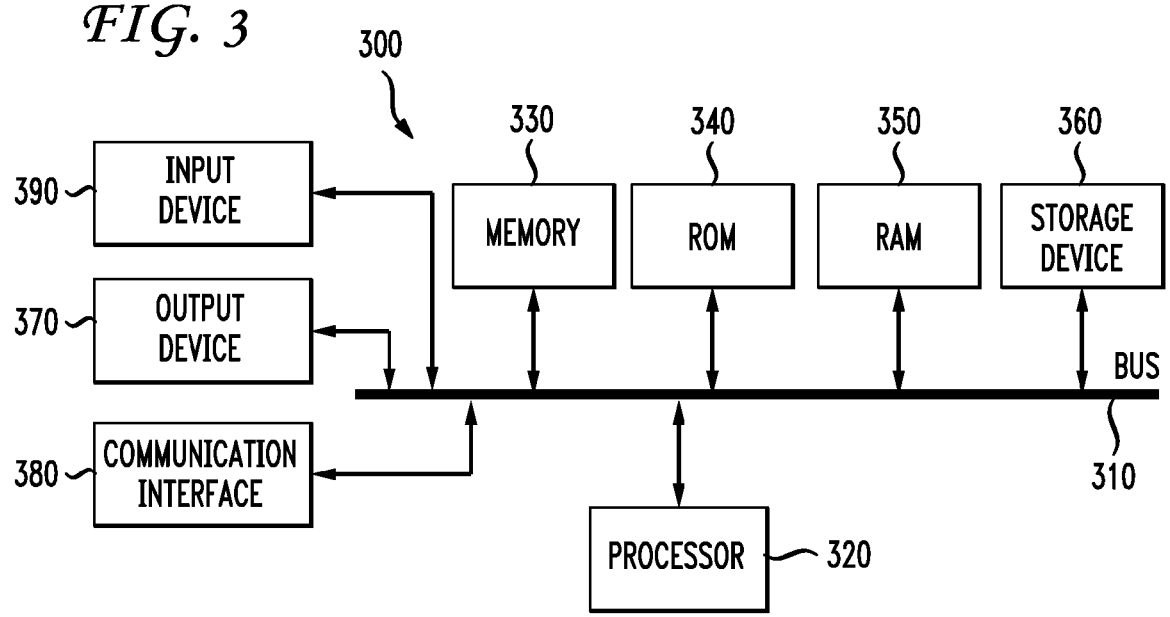
FIG. 3 illustrates the basic architecture of the system or device embodiment of the invention.

With reference to FIG. 3, an exemplary system includes a general-purpose computing device 300, including a processing unit (CPU) 320 and a system bus 310 that couples various system components including the system memory such as read only memory (ROM) 340 and random access memory (RAM) 350 to the processing unit 320. Other system memory 330 may be available for use as well. It can be appreciated that the invention may operate on a computing device with more than one CPU 320 or on a group or cluster of computing devices networked together to provide greater processing capability. The system bus 310 may be any of several types of bus structures including a memory bus or memory controller, a peripheral bus, and a local bus using any of a variety of bus architectures. A basic input/output (BIOS) stored in ROM 340 or the like, may provide the basic routine that helps to transfer information between elements within the computing device 300, such as during start-up. The computing device 300 further includes storage devices such as a hard disk drive 360, a magnetic disk drive, an optical disk drive, tape drive or the like. The storage device 360 is connected to the system bus 310 by a drive interface. The drives and the associated computer readable media provide nonvolatile storage of computer readable instructions, data structures, program modules and other data for the computing device 300. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 300, an input device 390 represents any number of input mechanisms, such as a microphone for speech, a touch-sensitive screen for gesture or graphical input, keyboard, mouse, motion input, speech and so forth. The device output 370 can also be one or more of a number of output mechanisms known to those of skill in the art. In some instances, multimodal systems enable a user to provide multiple types of input to communicate with the computing device 300. The communications interface 380 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 3 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 1A:
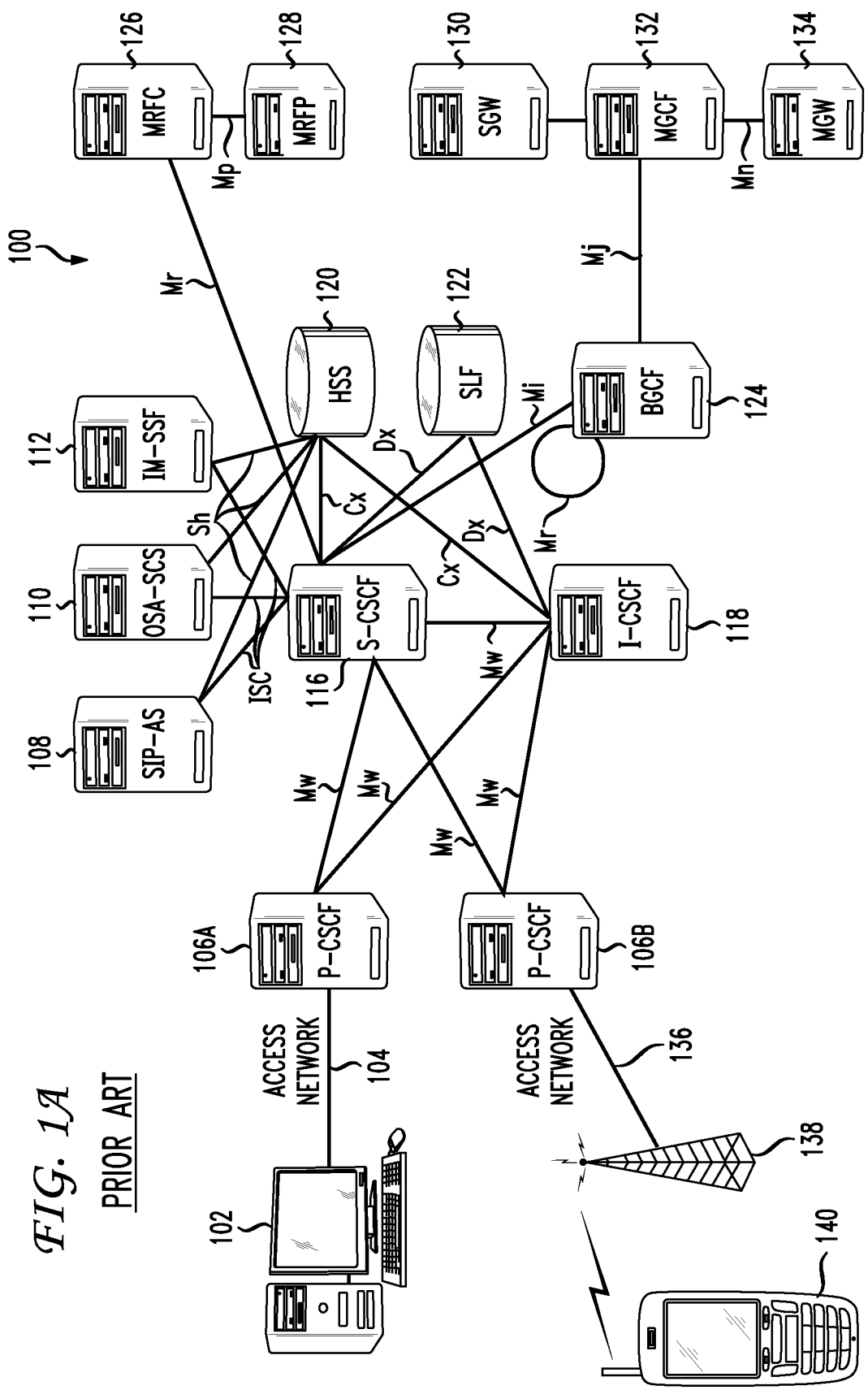
FIG. 1A illustrates the prior art basic IMS network components.
Figure 1B:
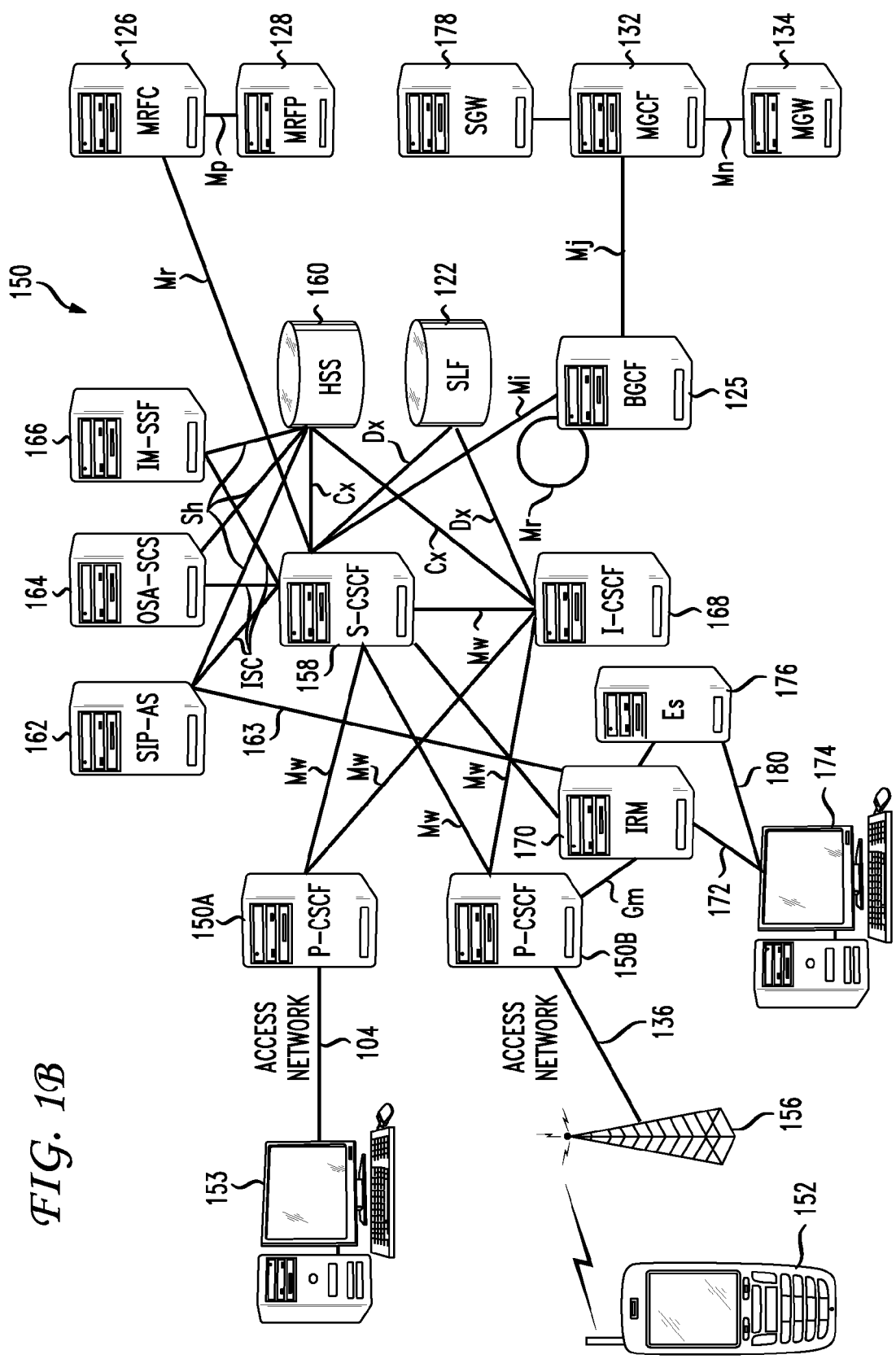
FIG. 1B illustrates the basic components of the IMS network according to the invention.

FIG. 1B illustrates the basic architecture of an IMS network device that manages devices according to the invention. As is known in the art, the basic IMS architecture includes a transportation layer, an IMS layer and a service for applications layer. It may be preferable that the network device disclosed herein be located in the applications plane. As is shown in FIG. 1B, the general architecture 150 includes an end user device 152, 153 that registered with P-CSCF 150A, 150B. The P-CSCF 150A, 150B represents a proxy call session control function that is a collection of several roles of SIP servers or proxies that are used to process SIP signaling packets in the IMS system. Thus, node 150A, 150B is a SIP proxy that is typically a first point of contact for an IMS terminal 152, 153. It can be located in either a visiting network or in the home network when a visiting network isn't IMS compliant yet. Some networks may use a session border controller for this function. The terminal 152, 153 discovers its P-CSCF with either DHCP or its assigned in the PDP context for example in the general packet radio services (GPRS) via link 156, 104. Typically, the P-CSCF 150A, 150B is assigned to an IMS terminal 152, 153 during registration, it's not just changed for the duration of registration and it sits in the path of all signaling messages and can inspect every message. The P-CSCF 150A, 150B can authenticate the user and establishes an IP SCC security association with the IMS terminals 152, 153. This can prevent spoofing attacks and replay attacks and protects the privacy of the user. Other nodes can trust the P-CSCF 150A, 150B and do not have to authenticate the user again. The P-CSCF 150A, 150B can also compress and decompress said messages using SIC COMP and can reduce the roundtrip over slow radio links. The P-CSCF 150A, 150B may also include a policy decision function (PDF) which authorizes media plane resources such as a quality of service (QOS) over a media plane and which can also be used for policy control, bandwidth management and so forth.

Charging records may also be generated according to this module. The P-CSCF 150A, 150B can also provide a registration communication to a serving-CSCF 158. This is a central node of the signaling plane and is a SIP server but performs session control, too. It is typically located in the home network and uses diameter Cx/Dx interfaces to the home subscriber server (HSS) 160 to download and upload user profiles. It has no local storage of the user information. All necessary information used by the S-CSCF 158 is loaded from the HSS 160. Other functions of the S-CSCF 158 include handling SIP registrations, which allows it to bind the user location and the SIP address, sitting on the path of all signal messages and can inspect every message, deciding to which application server (S) 162, 164, 166 the SIP message will be forwarded in order to provide their services, providing routing services, using electronic numbering (ENUM) lookups when necessary, enforcing the policy of the network operator. ENUM lookups are used when there is a dialed number. There may be multiple S-CSCFs 158 in the network for load distribution and high availability reasons and it is the HSS 160 that assigns the S-CSCF 158 to a user when it is queried by an interrogation-CSCF 168. A network device such as an interface registration manager (IRM) 170 is shown as providing registration communications with the P-CSCF 150A, 150B as well as notification of registration communication from the S-CSCF 158.

As shown in FIG. 1B, there are several interfaces to the registration network device (IRM) 170. First, there is a web interface 172 that is usually used by user equipment 174 (wired or wireless) or may be used by a telecommunications portal. This interface 172 may represent any communication link or protocol. The equipment 174 may represent any wired or wireless computing device or communication device. The user may either actively give the information needed for a registration or can rely on populated scripts chosen from menus, buttons or other interface mechanisms. The telecommunications portal is the only application for which an interface to the network device 170 to initiate registration is preferred for this embodiment because of its direct user involvement. Registrations by other application servers would be possible by the architecture of FIG. 1B.

Another source of initial registration is a notification of events from the enablers 176. An enabler is software that can be accessed by multiple applications over a defined interface. For example, many applications may need to know the location of a cell phone with a GPS. Each application could get that information from a location enabler. Those of skill in the art would understand how an enabler may communicate with other network elements to obtain various types of information that may be needed by an enabler. For example, signals such as a notification signal of a location of a user may be provided from an enabler 176 to the network device 170. The network device 170 may subscribe to specific events and get notifications when they occur. Any enabler capable of sending notifications may be used. For example, a presence enabler 176 would usually receive information from the registrations rather than giving it. Enablers 176 may also be used for authentication of the user or the user's device that requests registrations of a web interface. An identity management enabler 176 could be used. If the device 152, 153 were an IMS device with a UICC, the generic bootstrapping architecture (GBA) would preferably be used for authentication. An application server 162 may also change a registration as is shown by the interface 163 in FIG. 1B.

The network device 170 preferably requires credentials for each user that it could register in order to partake of the basic IMS registration process which is not being changed according to the principles disclosed herein. These credentials would either be provisioned in the network device 170 or made available over an interface (not shown). The other interfaces to enables can include the notification enabler which allows the network device 170 to notify the user when registrations of the registration state meets user defined criteria. As viewed by the P-CSCF 150A, 150B, the S-CSCF 158 and HSS 160, the network device 170 looks like a user. Therefore, there would be no need for changes to the S-CSCF 158 or the HSS 160. The same interfaces would be supported.

For example, interfaces for the network device 170 would include Gm to the P-CSCF 150A, 150B which is used to exchange messages between user equipment and the CSCFs typically using the SIP protocol. Another interface may include the Gm to P-CSCF functionality in SGW 178 using a signaling gateway interface. Another interface may include Ut-HTTP or WAP to user. Yet, another interface may be Mb-voice connectivity to the user or Sh to HSS 160 and possibly a separate interface to a credential server. An interface 180 between the identity management enabler 176 and the equipment or computing device 174 may be via an internet protocol, IMS-based protocol or any other communication mechanism. As has been noted above, a primary service of the network device 170 is to serve as a proxy for endpoints that current cannot register in the IMS system such as PSTN or off network endpoints. Secondary functions of the network device 170 can make the user experience easier and more intuitive and involve providing functionality disclosed which encompasses the other various embodiments of the invention which include providing macros, defining registration states, providing remote de-registration process, providing automated registration changes, providing the user with the ability to receive a registration for review and receive registration alerts. Details on these various functions are provided in more detail below. The network device 170 may need to communicate with the P-CSCF 150A, 150B and user equipment 152, 153 in enhanced ways to allow setting up of a tunnel between them and where appropriate may enable the communication between the various nodes in the system. Normal registration from user equipment using the standard IMS defined protocol will continue to be supported.

Figure 4:
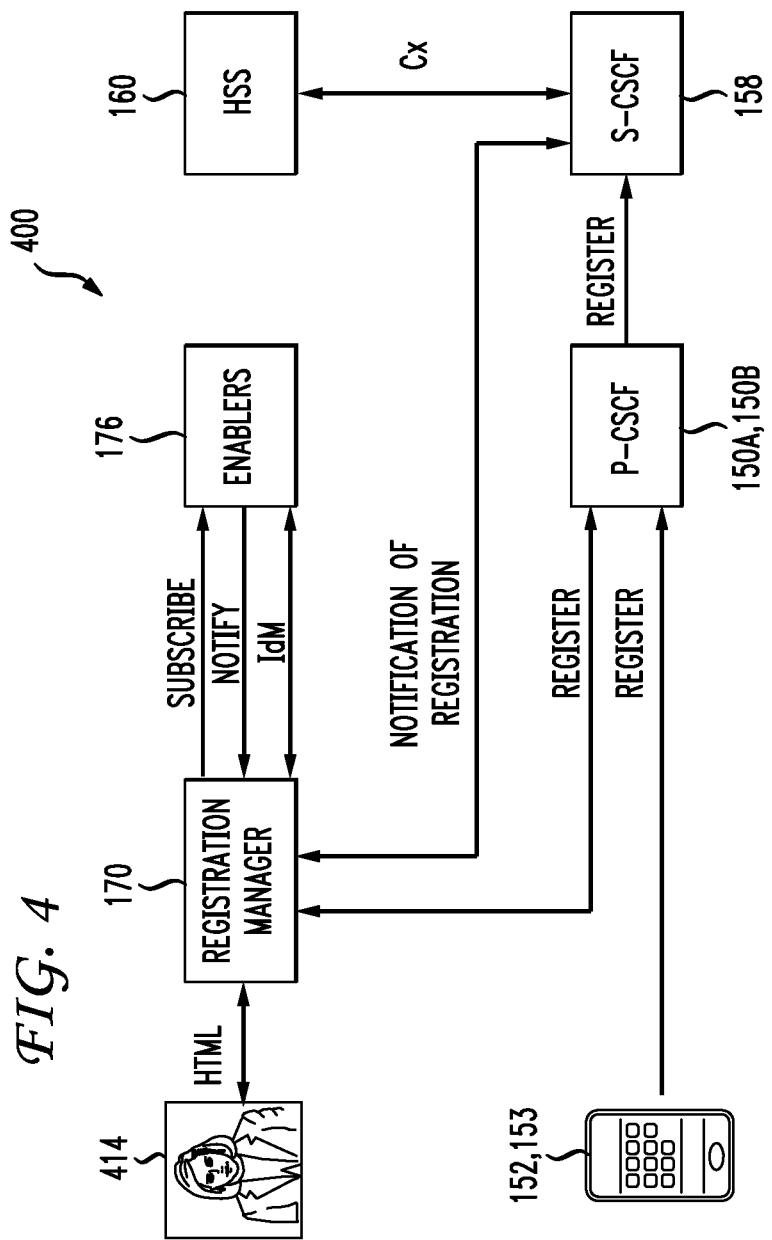
FIG. 4 illustrates an example of a location-based registration.

FIG. 4 illustrates a simplified version of the various network nodes shown in FIG. 1B.

Figure 1C:
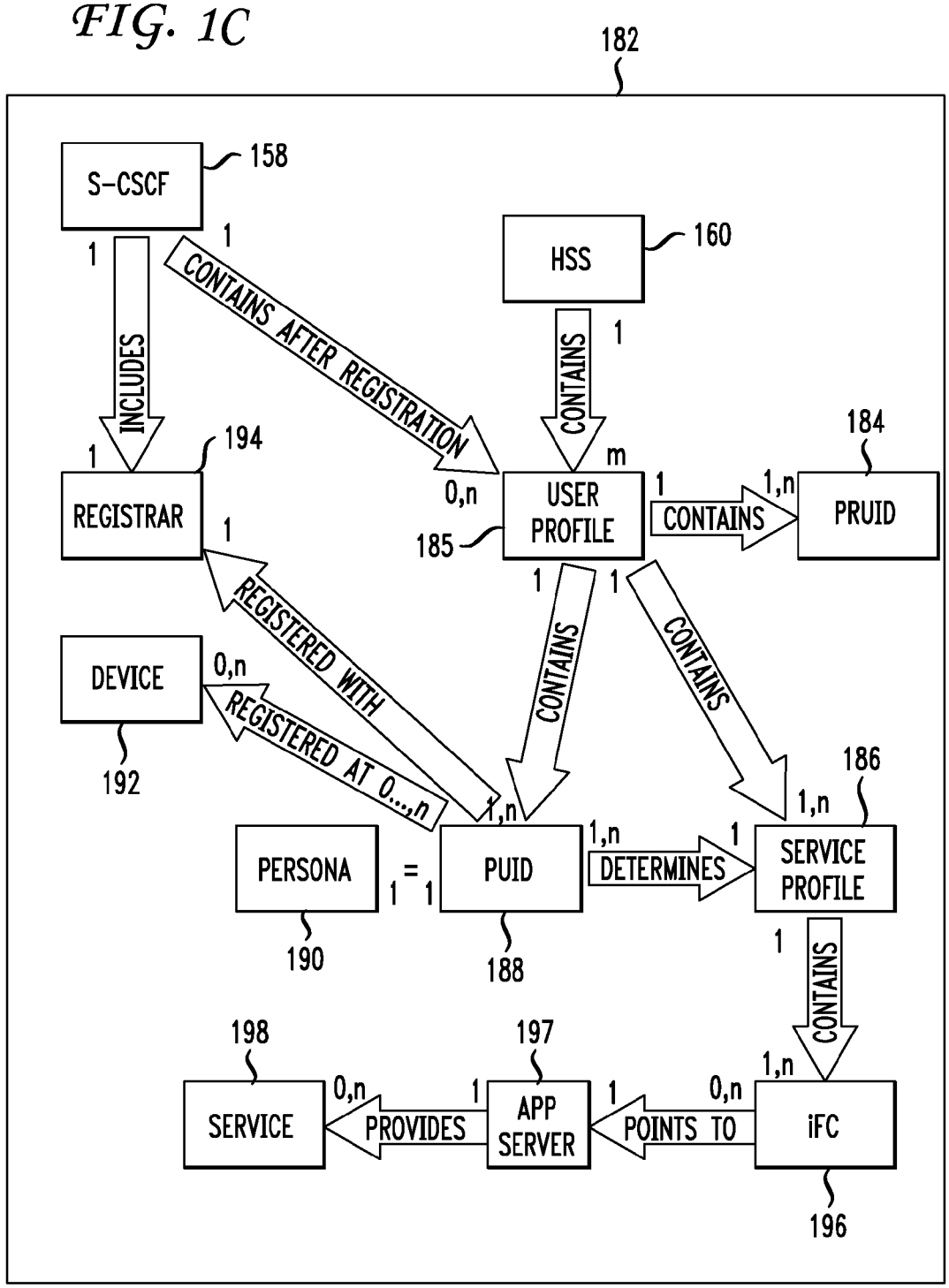
FIG. 1C illustrates the relationship between major entities involved in a user-centered paradigm.

Before proceeding to further discuss the various embodiments of the invention related to registrations, this disclosure will next provide some background information, the concept of personas, service mobility and a user-centric network paradigm. FIG. 1C illustrates the major entities involved in a user-centric approach.

The term "personas" is being used herein this patent to denote the change to a network architecture that supports a user-centric paradigm. In the industry, "personas" tends to be used to mean only multiple service profiles on a single device, usually for outgoing calls. For example, a cell phone would offer the user a choice of personas when making a call. Therefore, the term "user-centric paradigm" is preferred.

The customer should be able to have different sets of services for the different roles (personas) that they may assume in different situations with different contacts. These persona-based sets of services should be available for both originating and terminating sessions from any equipment used by our customer, from any access network. This capability is captured by the following definition.

A user centric-paradigm 182 provides the ability of the network architecture to support one or more service profiles 186 per user, each of which could be used from multiple, if not all, network accessible devices 192.

There are two parts to this definition. The first part involves the ability of a single user on a single device to have a choice of services defined by a choice of service profiles. This is what is frequently meant by personas. IMS is designed to support this concept. The different services available to each persona are defined in the IMS Service Profile. Each user profile 185 may contain multiple service profiles. The method for determining the service profile 186 by the S-CSCF 158 is through the use of Public User Identities (PUIDs) 188. Each PUID 188 will indicate a specific service profile 186. The originating S-CSCF 158 uses the PUID 188 in the P_Asserted_Identity Header or the IMS message to determine which service profile 186 to process for originating services. The terminating S-CSCF uses the PUID 188 in the Request URI Header to determine which service profile 186 to process for the terminating services. The fact that a single user may have different public user identities that can be used means that a single user may have multiple personas.

The second part of the definition focuses on the concept of service mobility. The user may have these persona-related services on any equipment that the user employs. This is what gives real power to the concept of personas and changes the network paradigm to a user-centric one. Without this concept, each piece of equipment would have its own dedicated service profiles. With service mobility, the service profiles are bound to the user and not the equipment. They follow the user to any piece of equipment. With them, the PUIDs 188 carry the network addressing approach (PUIDs are used by IMS to address users) and the network accounting approach (PUIDs are used by IMS to determine to which account a session is charged) making the transition to a user-centric network paradigm complete. The network notes the movement of the user and PUIDs between different network addresses and equipment through the process of registration.

Service mobility, the mobility of services from device to device, is distinguished from device mobility, the mobility of devices from location to location (e.g. cell phones).

FIG. 1C shows the relationships between the major entities involved in the user-centered paradigm. The persona 190 is represented by a PUID 188. Each PUID 188 may be registered at one or more devices, or may not be registered. Each device may have any number of PUIDs 188 registered at its address. Each PUID 188 is contained in a specific user profile 185. Each user profile 185 has its own distinct set of PUIDs 188. If any of the PUIDs 188 in the user profile 185 is registered, then it is associated with one specific S-CSCF 185. If a PUIDs 188 is not registered, then it is not associated with a S-CSCF 158. The user profiles 185 also contain at least one service profile 186. The service profiles 186 are used to determine which services a persona or PUID will get. Each PUID points to only one service profile 186 which is used to determine its services. The service profile 186 is composed of initial Filter Criteria (iFC) 196 which are the mechanism for determining the services. Each service profile 186 will have at least one iFC 196. The S-CSCF 185 processes the iFCs 196 to determine which application server 197 to invoke. Each iFC 196 is capable of invoking one application server 197. When the application server 197 is invoked, it can provide services 198.

The HSS 160 is where the user profiles 185 are stored and accessed. When a request for registration comes for a PUID 188 which is part of a user profile 185 that has no PUIDs registered, the HSS 160 chooses an S-CSCF 158 to handle that user profile 185 and sends the appropriate user profile information to it.

The Private User Identity (PRUID) 184 is specific to a particular device and a particular user profile 185. It is used to authenticate the specific User on the specific device.

This and other related inventions place functionality in the network that will allow the user to have more control of personas on both incoming and outgoing sessions and will allow persona-based services to be portable, usable from any device. Three new elements are introduced. The persona manager gives the user control of personas on incoming calls (something not provided by basic IMS), allows personas to be supported on equipment that is not able to assert multiple personas (through network-based capabilities), and makes the use of personas easier for all users. The registration manager or network device 170 enables more ways to register PUIDs. This will make it easier for the user to invoke personas using any equipment. The 2-Stage dialing server, or any other server, device or network element that performs a similar functionality, disclosed herein utilizes the standard voice portal capabilities gives the user a way to access outgoing persona-based services from any telephony equipment that can call the network.

Until now, telephony services have been offered with an equipment-based paradigm. Services of all types were applied to a line. If one had call forwarding, all the calls to that line would be forwarded. If one had Caller ID, identification would be based on the line that was used to make the call. "Follow-me" services of various types would take all the calls to one line and try other lines. Call waiting would be applied to a line, regardless of the user, and would not be available to the user on a different line unless that line also had call waiting. Advanced Intelligent Network triggers were also line based. Addressing in telephony has also been line based. One dials a number that is associated with a specific piece of equipment.

However, that is not how people think. People want their calls forwarded, not necessarily all the calls to a line. Usually, they care more about who is calling them than from where the call originated. They want services, such as call waiting, that are not associated with specialized equipment, to be available from any phone, not just one. When they call someone, they want to reach a person, a family, an institution, a store or a service.

Many of telephony's most successful services tried to bridge the gap between the user whose needs were communication oriented and the network which was based on equipment. The 800 service created a level of abstraction between the dialed number and the terminating number to which the caller was eventually connected. This created more of a sense of dialing a service rather than a line. Interactive Voice Response systems got additional information from the calling party to determine how to complete the call. Wireless service providers met this consumer need by providing personal mobile devices. By equating the device with one specific user and allowing device mobility, an identity was created between the device and user that gave the illusion of dialing a number associated with the user rather than just the device. This proved to be a very powerful concept. To some extent, wireless devices have displaced some wireline devices because of the power of this paradigm. However, many continue to list multiple devices with which they are associated (cell, home, work, etc.) and there will continue to be a need for both wireless and wireline access because they will always support different form factors. Mobile devices will never have 50-inch screens or large woofers.

Billing and accounting also began as line-based. Basic billing is done based on the line that is used to make the call. The movement towards enabling some degree of user based billing began with third-party billing. Operators would charge a call, with confirmation, to a third number. Later, calling cards helped automate this capability. With these the network authenticates a user by validating a PIN and charges an account associated with the user rather than the equipment employed in the call.

FIG. 1D shows the user-centric network paradigm 199 supported by this invention. Instead of revolving around the line, the PUID is the determinant of which services are provided; it is the basis of addressing. Accounting will be able to be based on PUID and all these capabilities will follow the PUID to any network address at which it is registered.

This new paradigm will allow many new classes of services that better meet customers' needs. Some of these benefits are explained next. Users can obtain specific services on shared devices. Many customers have shared phones in their homes, stores or offices. The user-centric paradigm enables the treatment of each user separately including distinctive alerting and individual call forwarding. Users have a choice of service profile (personas). The customer may choose different service profiles for communicating with different groups of people. Different uses of a phone used for shared purposes (e.g. a lawyer may want different services for personal use, for calls with clients and for calls with colleagues.) Service mobility is available. Customers can access the same services on any device within the limits of its capabilities. They can get their voice and video services from the service provider whether they are on wired or wireless networks. Persona based accounting is available. Accounting can be done by PUID. For example, all work calls could be accounted for together indicating the network, device and whether they were the originating or terminating party. Users can obtain selective access capabilities. By selectively registering PUIDs, users can control how they can be reached, even in environments where most calls are sent to voice mail.

This new paradigm is based on two core capabilities. These are the ability of the S-CSCF 158 to determine which service profile 186 to process for each session leg and the registration capability that will allow PUIDs 188 to be registered at any network location. These capabilities are combined with the addressing concept from SIP and IMS.

In SIP and IMS, addressing is done based on the Public User Identifier (preferably a SIP URI but may be some other identifier). An example of a dial-able PUID would be sip:+1-732-420-2159@att.net. Other examples of PUIDs include sip:steven.siegel@att.net, sip:steven.siegel.student@att.net, sip:siegel.family@att.net, or sip:Middletown_Library@att.net. Each of these may be considered a user. The middle column of FIG. 1D shows this relationship. In IMS, a user may have one or more PUIDs associated with its user profile. Each of these may be considered a persona. Each PUID may belong to one and only one user profile. A user profile may contain one or more PUIDs.

However, the PUID is more than just a telephone number. While it does play the role of a telephone number (a means to determine the other party in a session), it is not wed to a line or piece of equipment. It provides the basis for the user-centric paradigm.

A public identity is either a SIP URI or a TEL URI. A TEL URI looks like a dial-able SIP URI except that it starts with "tel:" instead of "sip:" and does not have a domain at the end. For example, for the SIP URI, sip:+1-732-420-2159@att.net, the comparable TEL URI would be tel:+1-732-420-2159. From the time that a number is dialed until there is an ENUM lookup, the domain is unclear. After the ENUM lookup (or a lookup by the BGCF), the domain should be clear and a SIP URI specifying the domain should be used. If this approach is used, the only PUIDs that will indicate service profiles to be processed by S-CSCFs 158 will be SIP URIs that belong to a service provider's domain or a domain provided service by a service provider. The S-CSCF 158 will look at TEL URIs only when determining how to route a session.

Figure 1E:
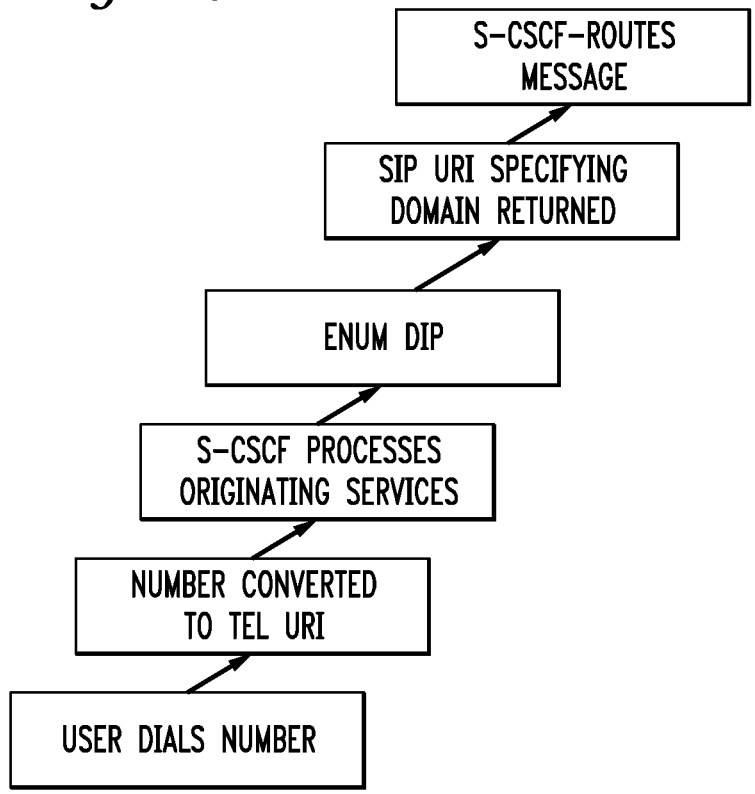
FIG. 1E illustrates a process of converting a dialed number to a SIP URI.

FIG. 1E shows the basic process to convert a dialed number from an IMS customer to a SIP URI. Once it is a SIP URI, it will be treated as a PUID by the network or sent out of the domain for terminating services based on its domain. Incoming messages should not be addressed to TEL URIs. They should come in only if they belong to a service provider's domain.

The left side of FIG. 1D shows that the PUID may be associated with any network address and the equipment at that address. This association can be made by a flexible registration process. Registering the PUID at an address means that the services associated with the PUID's service profile can be made available at that address and equipment. The result is service mobility.

Figure 1F:
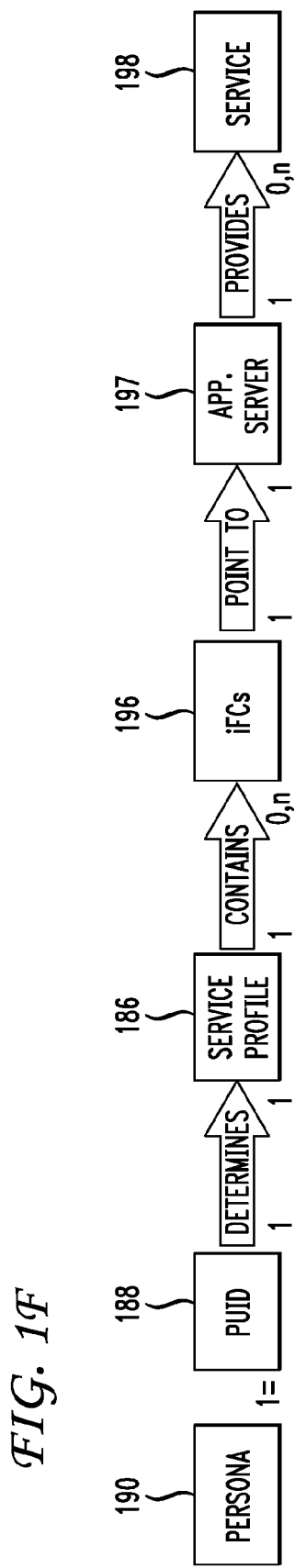
FIG. 1F illustrates persona determined services.

Personas are the different roles that a customer may play when receiving telecommunication services. The PUID represents the persona. In IMS, the persona of the originating party is represented by the PUID in the P_Asserted_Identity of the message and the persona of the called party is represented by the PUID in the Request URI. The services associated with the persona are defined by the service profile for that persona The right side of FIG. 1F shows that the PUID 188 determines which service profile 186 is used. The S-CSCF 158 processes the service profile 186 indicated by the PUID. The service profile determines which application servers are involved. On the originating leg, the S-CSCF 158 determines which service profile 186 to use based on the PUID in the P_Asserted_Identity header of the message it is processing. On the terminating leg, it uses the PUID in the Request URI. The service profiles 186 include initial Filter Criteria (iFCs)

196. These provide the means to decide which application servers 197 should be involved in a given session.

The PUID indicates one and only one service profile 186. The service profile 186 indicates one set of zero or more initial Filter Criteria 196 and the initial Filter Criteria 196 are used to determine which application servers 197 to involve in the call. This relationship between personas and services is shown in 1F.

The user profiles 185 have two parts. The core network service authorizations part is an optional part of the user profile and include what high level services the user may have. Examples would be video services or voice services. The other part is the service profiles 186 belonging to that user profile 185. Each service profile 186 has two parts. The first part is a list of public identities to which the service profile applies. The other part is the initial Filter Criteria (0 or more) 196 associated with that service profile.

The fact that multiple PUIDs may indicate the same service profile has several uses in IMS. They may be aliases for the same persona. For example, one might be dial-able and another might be more descriptive. As aliases, they should be part of the same implicit registration set. Another use of having more than one PUID indicating the same service profile would be to give different access capabilities to the user of these PUIDs. If, for example, at night one is registered and the other is not and people called the unregistered PUID, the S-CSCF 158 would process initial Filter Criteria 196 associated with the unregistered state of the PUID. This might result in the call being sent directly to voice mail. If the registered PUID were addressed, The S-CSCF 158 would process the service profile 186 normally and have the INVITE sent to the network address at which it was registered. When both were registered, they would be treated identically. A third use would be to preserve the capability to define the service profiles 186 for the two PUIDs differently in the future even though they are the same currently.

Figure 1G:
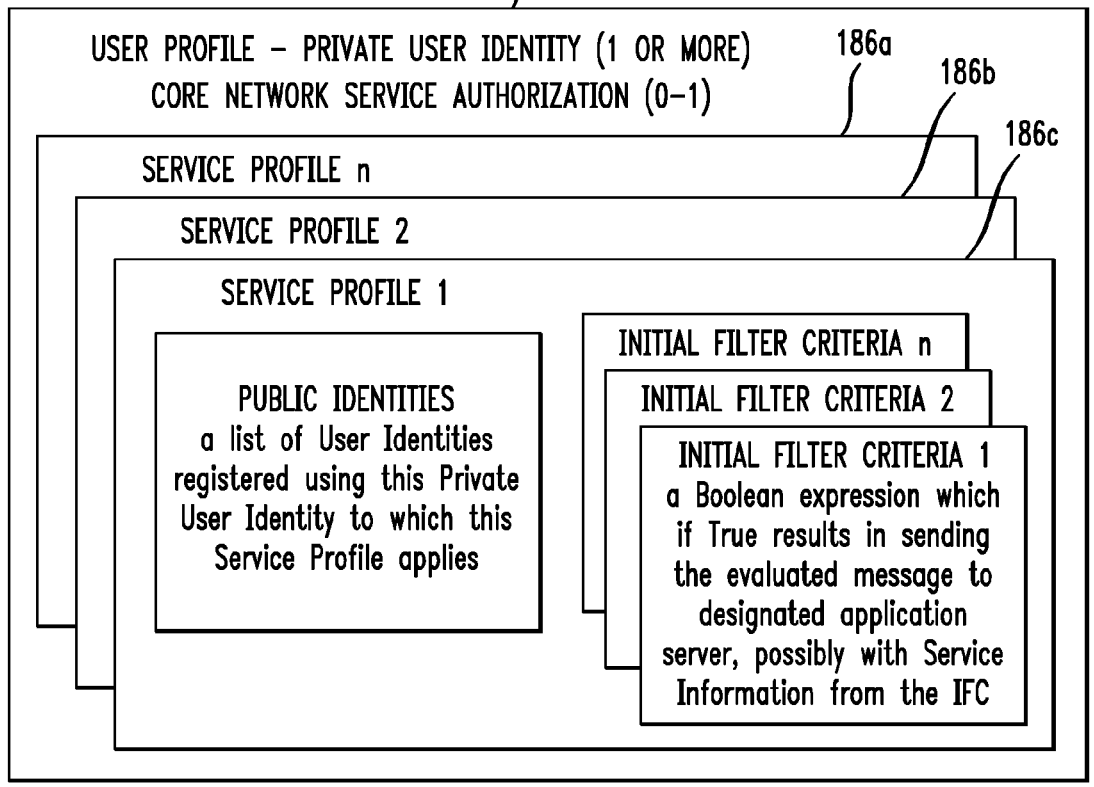
FIG. 1G illustrates further details of a user profile and a private user identity.
Figure 1H:
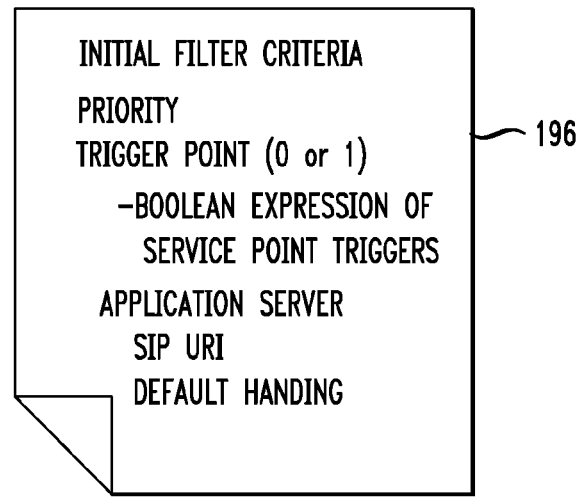
FIG. 1H illustrates an initial filter criteria.

FIG. 1G shows the structure of a user profile. This figure in connection with FIGS. 1F and 1H are discussed next. The user profile 185 and its components are stored in the HSS 160 and are loaded into an S-CSCF 158 assigned to the user at registration. Different service profiles 186a, 186b, 186c allow the user to get difference services on a session. Within the service profile 186c, the initial Filter Criteria (iFCs) 196 determine which application servers 197 get involved in the call. When the message is sent to the application server 197, it uses the PUID in the message to determine how it is to handle the service for that particular PUID. The initial Filter Criteria 196 is defined in an XML document and has a structure as shown in 1H.

Once the S-CSCF 158 has determined the service profile to process based on the PUID of the customer getting the service, it processes the initial Filter Criteria (iFCs) 196 that make up the service profile 186c. Each of the iFCs is processed in priority order. For each iFC, the S-CSCF 158 determines whether to invoke a specific application server 197 based on evaluating the information in the message header. Each service or package of services to which the PUID is subscribed would be represented by an iFC. Removing the iFC 196 would prevent the services associated with the designated application server 197 from being executed.

The first field in the iFC is the iFC Priority. The iFC Priority is a positive cardinal number. Because each service profile may have a set of iFCs, the S-CSCF 158 knows to process them in priority order, the lowest number processed first. The S-CSCF 158 will process iFCs in priority order until it runs out of iFCs (when it routes the message forward) or when it determines it must send the message to an applications server.

The second part of the iFC is the trigger point. The iFC trigger point is a boolean expression that is evaluated using the initial SIP message as the input data. When the trigger Point evaluates as TRUE, the S-CSCF 158 sends the message to the SIP URI in the application server 197 portion of the iFC 196. If it evaluates as FALSE, the next priority iFC is processed, if there is one, or the S-CSCF 158 sends the SIP message to its next hop. The trigger point applies boolean operatives to more atomic iFC service point triggers. The iFC service point triggers are used to check specific aspects of the SIP message being processed. Each service point trigger evaluates data in headers of the SIP message including any of the following information.

The Request URI could be checked for triggers to be used only when a specific resource is addressed. The SIP Method could be checked so that different application servers are invoked for INVITEs as opposed to MESSAGEs (or other methods). The presence or absence of a SIP header could be checked to prevent invoking a server that would process a specific header when it is not there.

The "session case" is usually checked so that different services could be applied to the originating leg from those applied to the terminating leg. Session case refers to whether the S-CSCF is handling the originating leg of a session or the terminating leg. The "session description" can be checked when special processing is needed by application servers for different services negotiated using the Session Description Protocol (SDP). The session description and session description protocol are used for the two sides of a session to negotiate capabilities, media formats and ports. This can include the session identifier and other session-level parameters, such as IP address, subject, contact information about the session and/or creator. Poikselka et al., Chapter 13, provides further details. The tests mentioned above could be for values, partial matches, or even the existence of a specific header. Time of day and day of week are not tests that can be done in the iFCs. Tests that cannot be done in the iFC trigger point can usually be done by the application server 197. In fact, CARTS and IMS allow these tests, which can be performed by the iFCs, to be done in the application server 197.

The last part of the iFC is the iFC application server part. It includes a SIP URI which tells the S-CSCF 158 where to route the message if the trigger point evaluates as TRUE. The default handling field tells the S-CSCF 158 whether to continue processing the SIP message or to stop processing it when the application server 197 it tries to send the message to cannot be reached. The last part of this section of the iFC is the service information. Service information is data that is appended to the SIP message when it is sent to the application server 197. Application servers 197 generally do not look into the body of the messages (working with headers) except for registration messages.

When the iFC evaluates to TRUE, the S-CSCF 158 sends the message to the application server 197 designated in the application server part of the iFC 196. If it sends the message to an application server 197, the S-CSCF 158 will mark the message so that the application server 197 will know where to send the message when it is finished with it (back to the S-CSCF). The marking may also be used for the S-CSCF 197 to convey back to itself where to resume the processing (which iFC is next). An application server may decide, based on its service logic and user specific application data to conclude the session setup. For example, it may have connected the call to an announcement. When this happens, the application server 197 will not send back the initial message (frequently sent back modified) but will send a message that moves forward the session setup. A 200 OK message is an example. The S-CSCF 158 will then skip evaluating any remaining initial Filter Criteria (those of lower priority) and route the message accordingly. Therefore, an earlier application server 197 invoked by an iFC with higher priority may change the actions of a subsequent application server 197 either by changing a field in the SIP message that the subsequent application server processes or by ending the processing of the SIP message by the S-CSCF 158 before the lower priority iFCs are evaluated.

The left side of FIG. 1D depicts the concept of service mobility. We have already shown how each PUID will have its own service profile and its own addressing. The left side shows that this PUID may be assigned to any network address and any device. Since it takes its services and Service Profile with it, the ability to register PUIDs at different network locations with different devices is the center of a network's ability to support service mobility.

The relationship between the PUID and a network address and the device at that address is done by the IMS registration process. Rather than giving an exhaustive account of IMS registration, the various embodiments disclosed herein focus on the use of registration for service mobility.

Figure 7:
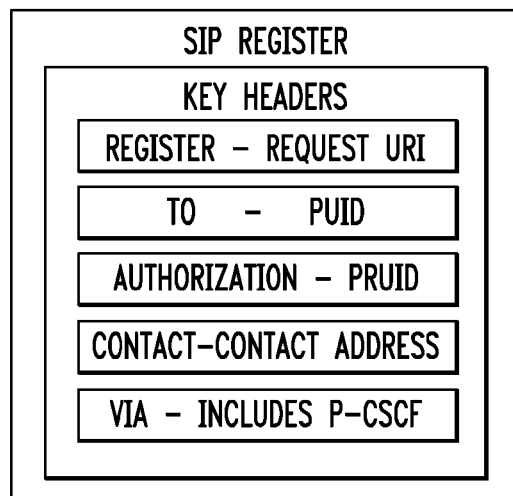
FIG. 7 illustrates basic headers for a SIP register message.

The IMS registration process starts with an IMS REGISTER Message being sent from the User Equipment to the home network. FIG. 7 shows the key headers of the SIP REGISTER message 700 that are used to make service mobility possible.

The first header is the Request URI. This header is used to designate the home domain to which the REGISTER message is to be routed and on which the PUID is to be registered. The next header of concern is the To Header. For most IMS messages, the To Header is used for end-to-end communication and supports ASCII. For example, the To Header might contain the string "Steve Siegel." However, in the REGISTER message the To Header has another purpose. The To Header contains the Public User Identity that is to be explicitly registered. This explicit PUID may be used to register all the PUIDs in the same implicit registration set. When any of these are registered, all will be registered. When any of the PUIDs in the implicit registration set are de-registered, all will be de-registered. The implicit registration set is a relationship between PUIDs in the same user profile 185 that is defined in the HSS 160.

Each PUID belonging to a user may be in at most one implicit registration set. While putting multiple PUIDs in the same implicit registration set decreases registration traffic and processing, it also makes it impossible to have different registration states for PUIDs in the same implicit registration set. For full functionality, all PUIDs would be registered and de-registered separately; they would not be in implicit registration sets.

The Authorization Header is used to convey authorization and authentication data. It is in this section that the Private User Identity (PRUID) 184 is conveyed (See FIG. 1C). Because the PRUID 184 is unique to both the PUID and the equipment, it does create some non-insurmountable problems for service mobility. The concept works best in conjunction with single user devices which are always registered when powered on. The PRUID is not as well suited for shared devices, for visited devices, for devices whose registration states are changed (which PUIDs are currently registered) or for registrations that go beyond the device used to initiate the registration (e.g. moves, de-registration from all devices, etc.).

The Contact Header includes the network address at which the PUID is to be registered. For example it could be an IPv6 address and would be a full address including the port number on which the User device is communicating to the P-CSCF (usually through a tunnel defined as part of the registration). The mapping of the PUID in the To Header to the network address in the Contact Header is an accomplishment of the registration process and necessary for service mobility. Another variable of importance in the Contact Header is the "expires" variable. It contains the length of time for the registration in seconds. When the time is exceeded, the PUID will automatically be de-registered from the Contact address. A new REGISTER Message could be used to extend the time. The "expires" in the Contact Header is also used to explicitly de-register a PUID from a Contact Address. This is done by setting the "expires" value to "0." Other important optional tags in the Contact Header are the ones that indicate the priority of the registrations ("q"), used by sequential forking, and callee capabilities, used to determine whether the registered location is a candidate to receive the session based on the request made by the calling party.

The last field that will be discussed here is the Via field. Communications to and from the user equipment is preferably done through a P-CSCF although other network nodes or functionality may be used. The REGISTER Message comes to the S-CSCF 158 through the P-CSCF 150A, 150B. The Via Header contains this path. This is how the S-CSCF 158 identifies the P-CSCF 150A, 150B. When communicating to the user equipment, the S-CSCF 158 takes the information in the VIA Header from the registration and uses it to form the Route Header of its message. This assures that the message will be sent to the user equipment via the proper P-CSCF 150A, 150B. The terminating S-CSCF 158 always sends the message to a P-CSCF 150A, 150B that is supposed to send it on to the called party.

While the same REGISTER message is used, registering the User for originating services and for terminating services involves different technical solutions.

Processes associated with the registration and originating service are discussed next. The final message in the registration process, indicating that the registration is complete, is the 200 OK message. After authentication and authorization and all of the other functions of the registration have been completed by the S-CSCF 158, a 200 OK message is sent from the S-CSCF 158 which has performed the registration to the "user agent" that initiated it with the REGISTER message. The user agent or SIP User Agent is the software that represents the user in SIP exchanges. As with all messages sent between the user equipment and the S-CSCF 158, this message is sent via the P-CSCF 150A, 150B. No direct contact from the user equipment to the S-CSCF 158 is allowed.

Figure 8:
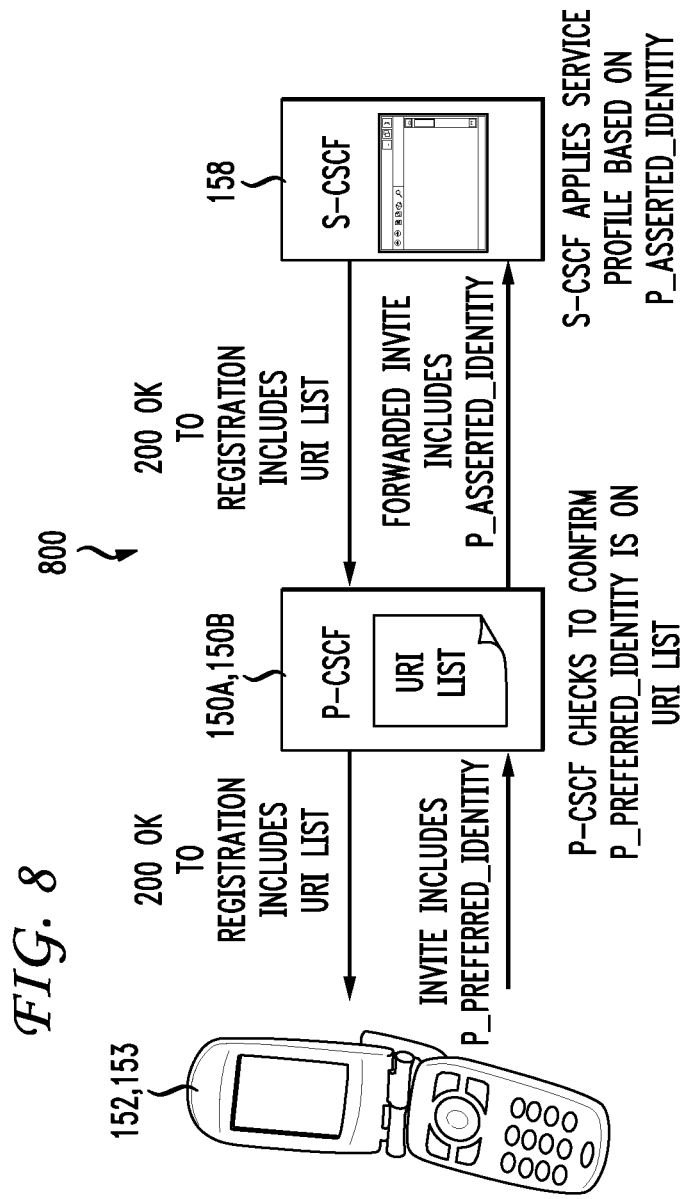
FIG. 8 illustrates sending registration information from the S-CSCF to the P-CSCF UE in a 200 OK message after successful registration and conveying the registered PUIDs back to the S-CSCF at session initiation.

FIG. 8 illustrates the IMS registration and originating services approach. The 200 OK message and it relationship to future requests for services from the user equipment 152, 153 are shown. The 200 OK is sent from the S-CSCF 158 to the user agent that has performed the registration via the P-CSCF 150A, 150B that was used by the REGISTER message. It indicates that the registration has completed successfully. If it is the first registration of a PUID for the user, the S-CSCF 158 will have been selected to handle that user by the HSS 160. If the user already has at least one PUID registered, the same S-CSCF 158 will be used for all PUIDs associated with that User. If it did not have them before, the S-CSCF 158 will have gotten from the HSS all Service Profiles associated with the User Profile that it needs before sending the 200 OK Message. The Route Header of the 200 OK Message indicates the P-CSCF 106B through which the message is to be routed. This has been created in normal SIP fashion from the Via Header of the REGISTER Message that started the registration sequence. This is the method that SIP messages use to force responses over the same path. The Request URI of the 200 OK Message is the address from which the original SIP REGISTER message was sent. The 200 OK Message contains a list of one or more PUIDs (SIP URIs) that have been registered as a result of the transaction. There will be more than one only if the explicitly registered PUID (the PUID included in the To Header of the REGISTER Message) is part of an implicit registration set. All PUIDs in the same implicit registration set, as defined in the HSS 160, will be registered or de-registered together if any of them are registered or de-registered. The P-CSCF 150A, 150B, after receiving the 200 OK, makes a copy of the list of registered PUIDs contained in that message before forwarding the message on to the user agent associated with the user equipment 152, 153. The user agent may already have registered other PUIDs that at the time of this 200 OK were already registered at the same Contact Address. There are two reasons for these separate registrations.

The user may be registering multiple PUIDs on the same piece of equipment simultaneously. This would allow the choice of personas. If they were all part of the same implicit registration set, they would have to be all registered and de-registered as a group. If, however, the user ever wanted to give access to any device to only some of the PUIDs and not others, they would have to be registered separately at all times because they could not be part of the same implicit registration set.

Multiple users may share the same device. While this is not common with personal wireless devices, it is very common with wireline devices. For example, a typical home phone may have separate PUIDs registered for Mom, Dad, Brother, Sister, and for the family. A store may have separate PUIDs for the store, the owner, and for each of the employees. In these cases, separate registrations would be preferred.

If the P-CSCF 150A, 150B already has a list of allowable PUIDs from the contact address, the new ones do not replace the existing ones, but are added to them. When the user agent receives the 200 OK, the message will still contain the PUID newly registered (or the list of PUIDs if there is an implicit registration set) Therefore, the User agent will know which PUIDs it is allowed to use.

By this means, the user agent and the P-CSCF 150A, 150B will know which PUIDs are allowed from a specific network address. When initiating a session, the user agent will designate which PUID is requesting the service. It does this by placing that PUID in the P_Preferred_Identity header of the SIP INVITE. It may place any of the PUIDs that are currently registered at its location from any registration that have been successfully performed.

All communications to the IMS core from user equipment 152, 153 goes through the P-CSCF 150A, 150B. This P-CSCF 150A, 150B was initially discovered by the user agent and was used to send the REGISTER messages. The same P-CSCF 150A, 150B must be used for all subsequent SIP communications. Therefore, the INVITE is sent from the user agent via the P-CSCF 106A, 106B used in registration. This P-CSCF will check the P_Preferred_Identity header to determine if the PUID that it contains has been registered (that it was included in a 200 OK message processed by the P-CSCF). If the PUID in the P_Preferred_Identity was not registered, the specifications allow the P-CSCF to be provisioned to either reject the INVITE or to change the PUID representing the user to a PUID that was registered. The method of choosing this PUID is not specified.

If the Public User Identity in the P_Preferred_Identity header is registered, then the P-CSCF will remove the P_Preferred_Identity header from the message, add a P_Asserted_Identity header with the same PUID, and forward the message to the S-CSCF 158 at which the User is registered. All PUIDs associated with the same User Profile will be handled by the same S-CSCF. This S-CSCF is established when the User registers its first PUID and will remain in effect until the last PUID belonging to the User has been de-registered (explicitly or by expiration of the registration) from all contact addresses.

Once the INVITE arrives at the S-CSCF 158, it will act as an originating S-CSCF 158. It will take the PUID in the P_Asserted_Identity header and use it to select the Service Profile that is to be processed. This process, which allows the PUID to be registered from any equipment and then allows the User Agent to use that PUID to tell the S-CSCF 158 which services to supply, enables service mobility for originating services. Wherever the PUID is registered, the same service profile and its services may be invoked. Of course, for this to work, services must also be designed to work with any user equipment over any access network.

Registration and terminating services are discussed next. The way registration is used by terminating services is different from for the way it is used by originating services. With originating services, the network gives the user agent at a specific address the right to invoke certain PUIDs and polices that invocation. Service mobility is accomplished by allowing the same PUID to be registered at multiple addresses, empowering multiple user agents to invoke the same services. With terminating services, the sessions are coming in to the terminating S-CSCF to specific PUIDs. The issue is having the session delivered to the address or addresses at which the PUID is registered. If the Public User Identity sip :john.doe@att.net is registered at his SIP phone at his home which is located at an IPv4 address such as 192.168.44.202, the INVITE should be routed there. If it is registered at a SIP phone at his office with a different IP address, the INVITE should be delivered there.

The SIP Registrar function in the terminating S-CSCF 158 is the mechanism that maps the PUID to the specific network address(es) at which the user is registered. In the PSTN, addressing was originally done directly (when done by switches rather than operators). The number dialed indicated the line that was to terminate the call. This direct approach is becoming less and less the rule as 800 service, network call distribution, local number portability and other services have been introduced. SIP addressing is indirect. The PUID represents a user, not a network address. As discussed before, a single PUID may be registered at any network address. At any given time it may be registered at 0, 1 or more addresses simultaneously. Sessions are addressed to a PUID by placing the destination PUID in the Request URI. It is up to the SIP registrar functionality in the terminating S-CSCF 158 to resolve that to an addressable location.

As discussed earlier, the SIP REGISTER message contains the information necessary to perform the registration (See FIG. 9). The PUID being registered is in the To Header. The Contact Header includes a SIP URI which designates the network address at which the PUID is to be registered. The address would be a full IP address including the port number of the security association (e.g. tunnel) between the User Equipment and the P-CSCF 150A, 150B. For example, the SIP URI in the contact header might be sip:[192.168.44.202]:122@att.net. This URI is not a PUID, but represents the IP address of contacts involving this registration. The P-CSCF 150A, 150B used by this contact location was conveyed by the Via Header. These three pieces of information are used by the SIP Registrar function in the Terminating S-CSCF to route calls that come into it for a PUID that it is servicing.

FIG. 9 represents one line in SIP registrar 194 and shows an example of how an association from a single registration in the SIP Registrar of the S-CSCF 158 may be depicted. Other information such as the priority of the registration for sequential forking and the capabilities supported by the user equipment 140 this contact address are not shown.

Figure 10:
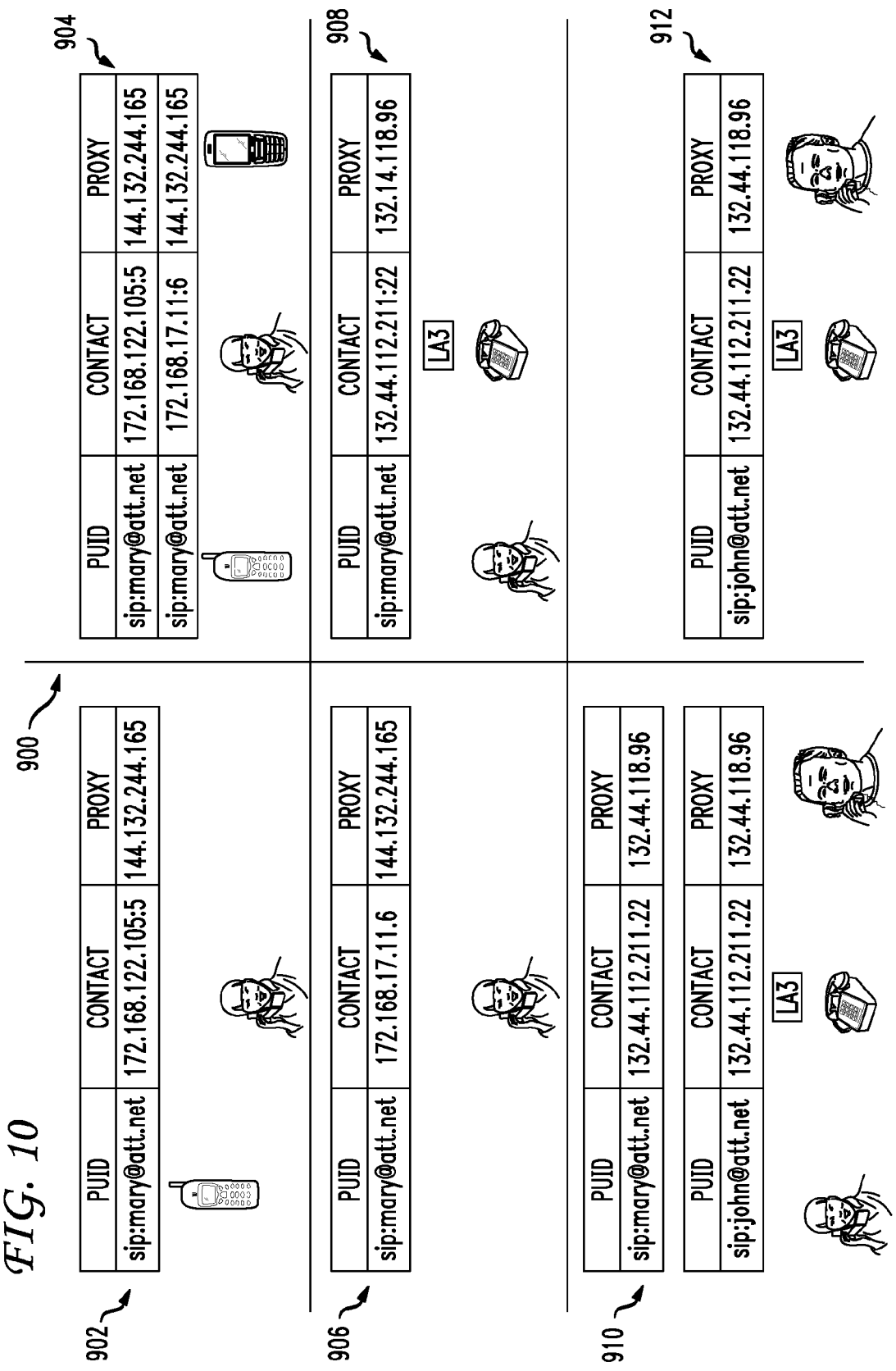
FIG. 10 illustrates various personas and the association with various devices.

FIG. 10 explains how the registration works with the SIP Registrar.

In area 902 of FIG. 10, a user is shown with a single registered device. The user's PUID is sip:mary@att.net and the network address of the device from which the registration was performed is 172.168.122.105:5. The registration was performed using the P-CSCF at 144.132.244.165. The table shows the registration entry for this PUID in the SIP Registrar 194. Currently, the sip:mary@att.net is registered at only one contact location.

Figure 11:
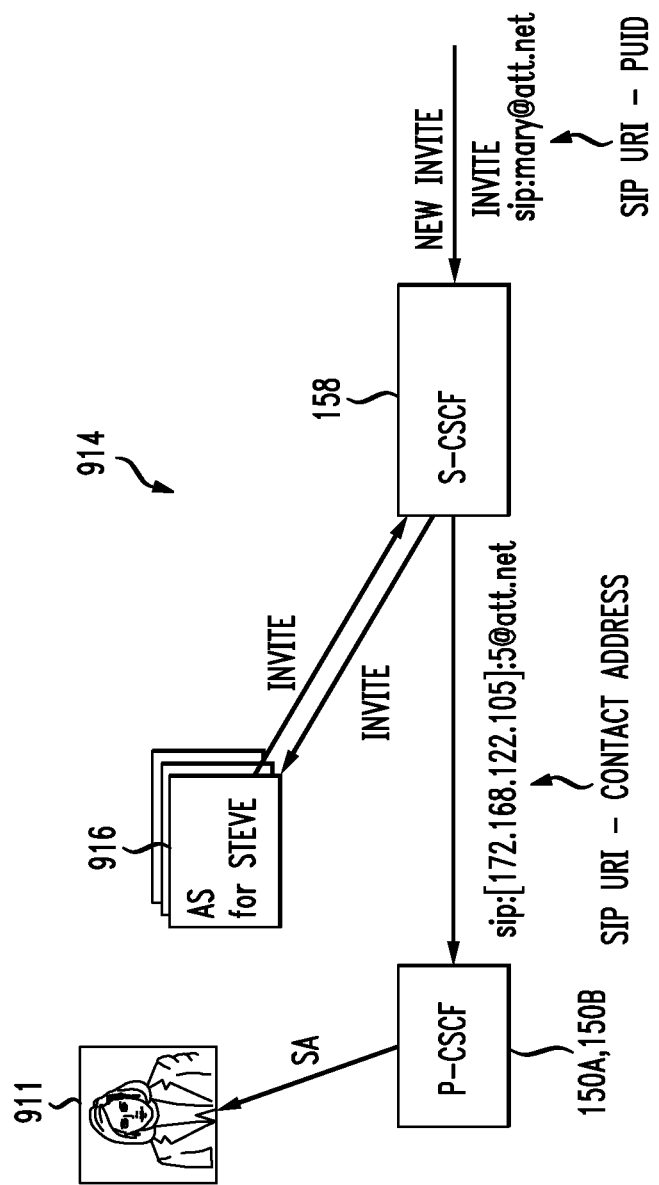
FIG. 11 illustrates a SIP Registrar changing the Request URI of a message.

If an INVITE were to come to the terminating S-CSCF 158 with the Request URI of sip:mary@att.net, the terminating S-CSCF would first process the service profile associated with the PUID and invoke any application servers that needed to be invoked. After processing the applications, the S-CSCF 158 needs to route the INVITE to the user. Assuming no changes by any application servers, the Request URI will still be sip:mary@att.net. Clearly, this is not routable as is. Therefore, the SIP Registrar function of the S-CSCF takes the PUID and looks up where it is registered. In this case, in the REGISTER message the SIP URI representing the location was sip: [172.168.122.105]:5@att.net. The SIP Registrar removes the original PUID (sip:mary@att.net) from the Request URI and replaces it with the SIP URI representing the Location Header from the registration (sip: [172.168.122.105]:5@att.net). The SIP Registrar also takes the information from the Via header of the REGISTER message, which indicates the P-CSCF and places it in the Route Header of the message being processed. When the S-CSCF sends this edited message, the network will use the Route Header to send the message to the P-CSCF that was used for the registration. The P-CSCF will then send the message on to the User Agent over the Security Association (SA) made with the user equipment 152, 153 and designated by the IP address and port in the Request URI. Other examples 904, 906, 908, 910 and 912 are shown for various IP and non-IP devices. FIG. 11 shows a SIP register routing process 914 which concludes with the terminating S-CSCF 158 routing the INVITE through the P-CSCF 150A, 150B to the user equipment 911. INVITE signals are communicated to and from the Application Server for STEVE 916.

Area 904 of FIG. 10 shows the user, having registered the same PUID on two devices. This results in two separate registrations being tracked by the SIP Registrar, both with the same PUID. Because they apply to the same User Profile, the two registrations will be at the same S-CSCF 158. At any time, only one S-CSCF 158 will be responsible for a single user profile, all its PUIDs and its service profiles. However, the P-CSCF 150A, 150B used will be determined independently by each registration and may not be the same one. With two registrations for the same PUID, when the SIP Registrar 194 processes the call, it will make a copy of the INVITE message and make changes to the INVITEs based on each of the registrations. It will then send the two INVITEs to their different destinations. This is called forking. Simultaneous forking means that the two INVITEs are sent out simultaneously and the session will be sent to the first positive response received. A BYE Message would be sent to the other locations that were sent the INVITE after one of them accepted the INVITE. Sequential forking means that the SIP Registrar will first send out one INVITE and will then send out the other only if the first is not answered positively. Sequential forking would be done in the order determined by the priority of the registration. The priority is established by a tag in the Contact header of the SIP REGISTER message.

There are several different defined forking policies. The S-CSCF 158 can be provisioned to use a default forking policy. An incoming request can also specify a forking policy. Application servers 197 may use this capability to change the forking method. There are four defined forking policies. These are: (1) No forking, which means that only a single copy of the message will be sent. If the PUID is registered at more than one address that could accept the message, the message would be sent only to the highest priority registered contact address; (2) Simultaneous or parallel forking involves making copies of the message which are sent in parallel to all of the Contact addresses at which the PUID is registered and which qualify to receive the message. Any of the Contact locations sent the message may accept the INVITE with a 200 OK message. Once the S-CSCF 158 has received a 200 OK to any of the messages it forked, it would send a BYE to the other forked locations; (3) Sequential forking involves the S-CSCF responding to a message to a PUID that is registered at more than one location by sending the message sequentially to each of the registered locations with the capabilities required by the message until it has received a positive response to its current message or it has exhausted the list. If priorities were set using the Contact headers at registration, the messages would be sent in the order established. If no priority was set, the order of registration could be used. Registrations that do not set a priority receive a default priority. Those that do have a tag setting priority would be able to set any value, higher or lower than the default. Each time a message was sent, the S-CSCF would wait until it received a response or timed out waiting. If the response was negative or if there was a time out, the previous try would be abandoned and an attempt would be made at the next address if there were one. When a 200 OK is received, no further forking is done and normal processing continues; (4) Mixed forking is a combination of the previous two. It does sequential forking when the priorities are different. When in the course of processing priorities, a priority level is encountered which has multiple registrations of the PUID with the same priority, those locations would be treated in parallel.

Area 906 of FIG. 10 shows the user on a different device from the device in area 902. The user has changed devices and is using the same PUID. The only changes made are in the SIP Registrar 194. This move was established with two separate REGISTER messages. The first REGISTER message, shown in area 904, registered the second piece of equipment. The second REGISTER message de-registered the first piece of equipment. De-registration is accomplished in the same way as registration, but with the expires tag set to 0. De-registration happens automatically by the network when the number of seconds in the expires tag has been reached.

Areas 908, 910, 912 of FIG. 10 show users on a shared device. John and Mary may be two workers sharing a work phone or may be two family members sharing a home phone. Even though these two Users with their separate PUIDs may be registered at the same Contact location, they could be registered with different S-CSCFs 158. Each S-CSCF 158 would be responsible for routing to its users. Because they are located on the same device, the two registrations are likely to use the same P-CSCF 150A, 150B. At times, the shared phone may have one User (Areas 908 and 912), and at times it may have multiple users (Area 910). The network does not automatically based on IMS Technical Specifications store information about which PUIDs are registered at specific addresses. It does store information about at which addresses specific PUIDs are registered. An enabler that subscribed to all registration events could keep track of which PUIDs are registered at a specific address if this information is desired. Enablers provide well-defined interfaces to common network functions, or shared data, allowing a company to reuse particular modules of program logic that are useful—but independent of—any particular application. Information about the current registration at each S-CSCF 158 and which registrations used which P-CSCFs 150A, 150B could be valuable for many uses, including the ability to recover from the failure of an S-CSCF 158 or a P-CSCF 150A, 150B.

Therefore, the IMS registration process enables service mobility. A PUID may be registered at any network address. Mechanisms exist for the registered PUID to be asserted from any location at which it is registered. This will result in the S-CSCF processing the service profile associated with the PUID. The service profile defines the user's services, making them mobile as the PUID is moved to different devices. Likewise, the registration process allows the delivery of the session to the user at any location at which the PUID is registered by using the SIP Registrar function of the S-CSCF. This means that there is also service mobility for services defined by a service profile for terminating services.

Of course, making service profiles follow PUIDs that could register at any Contact location is not enough. Services/Applications have to be designed in such a way as allows them to be device and access means independent. At least, they have to adapt to the limitations of specific devices or access technologies.

This disclosure now turns to the issues of registration of users in the IMS context. The basic IMS registration process is insufficient to meet the needs of customers in support of service mobility and a User-Centric network. There are several aspects of the basic IMS approach that are problematic. These are outlined in paragraphs [0015]-[0018] above.

The solution to the above problems is the network device and functionality disclosed herein which may act as a proxy for the user equipment performing proxy registrations and de-registration without using the actual devices. Requiring private user identities that are dedicated to a specific user (multiple public user identities may be supported) to be resident on the device limits the possibilities for new users to register on a device that is not pre-provisioned for that user. This is not a problem for dedicated personal devices that are always used by one user. It does become a problem for shared or visited devices. Examples of these include home phones, shared store, office or work phones, visitors' offices, etc. A network registration server that performs registrations as a proxy for the User ill have access to user-specific private user identities to be used after authenticating the user.

Another area of limitation relates to network initiated registrations or de-registrations. These might be event driven. They could happen at designated times of day, when a user's location has changed or when a change has been made in the presence information or registration state about the user. With basic IMS, any changes in registration status would have to involve REGISTER messages coming from the user equipment. The principles disclosed herein provide for the ability to remotely control and manage registrations.

Finally, there is the issue of network user equipment that is not capable of registering and de-registering itself. The network disclosed herein specifically includes user equipment behind line access gateways. This equipment will not have Universal Integrated Circuit Cards (UICC, a chip card used in wireless devices to register) and will not be able to register and de-register PUIDs, especially if it is shared equipment. GSM phones are in a similar category. The ability to register and de-register public user identities independent of each other is not well supported by current standards. It is also assumed that even some SIP equipment without UICCs will still be on the carrier's network.

These deficiencies stem from the initial needs of IMS. The first implementers of IMS were wireless service providers. They believed in the concept of a personal all-purpose wireless device. They initially felt that their customers would have exactly one device per user and that this device would not be shared. Service mobility was not necessary because they had device mobility and only a single device. Other devices were provided by other Service Providers. They wished that their customers would abandon the other devices, and the other devices certainly were not part of their concept of IMS.

Current network providers have more expansive needs. Some customers use a variety of devices, both wireless and wired. Most have multiple devices (home, office, cell, video). Users are mobile between devices, sometimes using one and sometimes another. Many of the devices are shared such as a home phone. Frequently, users want telecommunications services from a device with which they have had no previous relationship (neighbor's phone, hotel phone, air phone, etc.)

All of these issues can be addressed by a network-based device such as a registration manager with a web interface and capable of performing proxy registrations and de-registrations. One enhancement to IMS registration needed by carriers is the ability to have a network element register the public user identities as a proxy for the user equipment at whose address the PUID is to be registered. The basic IMS approach is to have the user agent on the user equipment automatically register a default set of PUIDs when the equipment is turned on. The default set of PUIDs and the registration credentials are provisioned.

The network device 170 will be able to act as a proxy for the user agent on the device to register or de-register the PUID on the device. There will be three means to initiate a registration by the network device 170.

A notification from an enabler application may be sent to the network device 170 initiating the registration. The notification may be based on time-of-day and day-of-week or the device 170 may initiate registration itself. Web access to the device 170 may be used to initiate the registration. The user may be dealing with HTML or may initiate a process by selecting a menu item or a button that results in the http interactions with the device 170.

The concept of the device 170 acting as a proxy for the user is straight forward. The device 170 responds to various events to initiate registrations or de-registrations. The device 170 would perform the registration as a proxy for the user at the designated network address. This can be completely transparent to the S-CSCF 158 and the HSS 160. They will authenticate using a private user identity provisioned on the device 170 or accessed by it. Registration is already done based on the contact header of the REGISTER message, not the originating address, so this is not a problem for the S-CSCF 158 and the HSS 160. The remaining issues are the user equipment 152, 153 and the P-CSCF 150A, 150B. The only thing that persona enabled user equipment needs to know is which PUIDs it may use. This information is currently communicated to the user device by the 200 OK message to the REGISTER message. If the 200 OK is not allowed without the REGISTER, then the system can use a NOTIFY or INFORMATION message as long as it requires an enhanced user agent that will know how to use it. The P-CSCF 150B will be able to do all of its registration functions in the normal manner except for the setting up of a security association with the user equipment associated with the registration. Whether the P-CSCF 150B will set up this tunnel based on the origin of the REGISTER message or the address in the contact header is not clear, although the specifications seem to favor the association with the contact address. It is preferable that the system is implemented this way and if not, an alternative approach allows the device 170 to initiate the agreement between the user equipment and the P-CSCF 150B.

Some items associated with the device 170 in order to initiate a registration include the public user ID to be registered, the contact address at which the PUID is to be registered, the P-CSCF to be used for accessing the user, the expiration time of the registration, the priority of the registration for sequential routing, and the capabilities of the device at which the PUID is being registered, and credentials by which to authenticate and authorize the registration.

The device 170 is preferably located in the Applications Plane and uses at least one or more of the following interfaces: Gm to P-CSCF, Gm to P-CSCF functionality in SGW (not shown), Ut—HTTP or WAP to User (not shown), Mb—Voice connectivity to User (not shown), Sh to HSS (possibly separate interface to a credentials server), and Interface to Identity Management Enabler. Its primary functions are to enhance the registration capabilities at IMS devices and to act as a proxy for endpoints that currently cannot register in IMS (e.g. PSTN or off-network endpoints). Making user's experience easier and more intuitive. A secondary function of device 170 is to make the user's experience easier and more intuitive. This is done by the various embodiments of the invention disclosed herein. These features include the ability to:

1. Perform moves and other macros.
2. Define registration states.
3. Perform remote de-registrations.
4. Perform automated registration changes.
5. Provide registration Review.
6. Provide registration Alerts.

For event driven registrations and de-registrations many of the information needed for the registration should be known. Credentials are a separate issue. For web-initiated registrations, it is expected that most of these that are initiated by the user would be done by the user choosing an option from a menu or by selecting a button. All the details would be pre-provisioned and scripted. There will also be the ability of the user to enter the specific information needed for the registration. The user should know which PUIDs are to be registered. Users might not know the network addresses of the equipment that they are using. One means of dealing with this is to give the user an alias for the equipment. Enough information would be kept in the network to determine what the network address is. It could be a fixed address. If it is not, other identification such as a MAC address might be needed in order to get the network address. The P-CSCF 150A, 150B may be fixed for some devices. However, network configurations change. One way to determine it would be to check if any PUIDs were registered on the device. If they were, the P-CSCF 150A, 150B of one of them could be used. If none were, the device 170 could pick a P-CSCF 150A, 150B based on information from the location enabler 176. Expiration time, priority and capabilities could use default values, values associated with the device or could be overridden by the user.

Credentials could be done in one of two ways. One, the device 170 could store or have access to credentials for each user; or two, the device 170 could be given permission to do any registrations after it is authenticated. These options would mean either that the device 170 would have a private user identity for each user profile or that a single private user identity could be used by multiple user profiles. Because the private user identity is only used as part of the authentication process for registration, the only problem that might result would be if the private user identity were used to identify the correct user profile. This is not necessary because the public user identity in the "to header" should uniquely identify the correct service profile and could be used instead of the private user identity. Therefore, one of the following two recommendations should be followed. They do not affect the architecture.

The device 170 may have available to it a separate private user identity for each user profile. These would be unique to the device 170. The user profiles may have multiple private user identities, or the device 17 may have its own private user identity that it may use for any registrations. Registration challenges would be based on this private user identity. This involves fewer private user identities than (1), but some specifications demand that a private user identity be unique to a user profile.

One way to initiate registrations that is useful and is not supported by the current IMS specifications is event driven or event initiated registrations. The device 170 can subscribe to events, usually with enablers, and be notified when the event happens. The result of the notification could be that the device 170 will register specific PUIDs at specific network addresses. Which PUIDs are registered and where they are registered could be dependent on the nature of the notification.

FIG. 5 shows an example 500 of how event driven registration might work. In this scenario, our subject, Mary, using the PUID sip:mary@att.net is registered only on her cell phone 502. The cell phone uses VOIP, so the registration is at an IP address, 172.168.122.105:5 stored in a database 508. When Mary with her cell phone enters the building 504 in which her office is located, the location enabler 176 notices this event and notifies the device 170. The device 170 automatically registers Mary on the SIP phone at her office 510 using S-CSCF 158 and HSS 160. In this example, Mary remains registered on her cell phone 508 and becomes registered on the SIP phone as well. Feature 510 represents the updated SIP Registrar in the S-CSCF to which Mary was assigned, now containing two entries for Mary; one for her cell and one for her office. Incoming calls would be forked to both phones. Outgoing calls from Mary would be allowed from both phones. In this example, the calls from the two devices go through different P-CSCFs 150A, 150B because they are on different access networks. What other actions that could have been taken are based on Mary's preferences. If she had wanted to re-register from her cell phone, set sequential forking, or register multiple personas, that would have been possible. When Mary leaves the building 506, this is also an event that causes the location enabler 176 to notify the device 170. As shown, she becomes de-registered from the office phone. New calls with Mary's PUID cannot be made from the office and incoming calls would go only to her cell phone. The entries in the SIP Registrar 512 go back to the same state as shown in 508. Making registration and de-registration based on common events to be transparent to the user and automatic may make it easier for the User to take advantage of the benefits of the new paradigm.

Customers way want to assume a specific registration state based independent data such as at certain times of the day. For example, the customer may want to automatically de-register from all phones between the hours of 1 AM and 5 AM. Whether this is totally automatic, whether it needs confirmation and how and if it could be overridden by the customer are service capabilities selectable by the user. The basic concept is that the customer does not want to be disturbed during certain hours, and the device 170 is used to set that up based on time.

Time-of-Day registrations would be difficult based on equipment initiated registrations. Each of the devices would need to be separately programmed to de-register itself at a specific time. With the device 170, a single element may be triggered by the time and perform all of the registrations and de-registration that are required.

There are many examples of when a customer would want to do a registration or de-registration while not at the equipment on which the registration is made. Thus, a web-based or remote registration is disclosed. One example would be de-registering from equipment after the customer has already left the vicinity of the equipment. For example, the customer may be working from home for the day and registered a work persona on the home phone. At night, he may go out with his wife, leaving his children home with a babysitter. If he leaves the home forgetting to de-register his work persona from the home phone, he runs the risk of missing a late business call. Even with his work persona registered on his cell phone, a business call, perhaps from Europe or Asia, to his work PUID would result in the INVITE being forked to both his home phone and his cell phone. If the babysitter or one of the kids answered the call first, the call to his cell phone would be dropped, not the desired outcome. Without the device 170, either the customer or someone else at home would have to initiate the de-registration from the home phone. With Web-Based registrations and the functionality of device 170, a menu item on a web enabled cell phone could initiate the de-registrations from all other phones.

Occasionally, our customers may need to register at a location for which there is no menu-driven script to initiate the registration. For example, this could happen on vacation or in a visitor's office on a business trip. In this case, the user could go through a telecommunications portal to specifically tell the device 170 what to do. Before the user is allowed to do anything, the user must be authenticated. There are many means to authenticate the user including the identity management enabler 176. The user will be authenticated in a manner acceptable to security policies. Once the user is known, the rights of the user need to be determined. Generally, a user will be given the ability to register or de-register only PUIDs that belong to that user. It would be possible to extend those privileges to all PUIDs associated with an account which the user owns or to specified other users. Which PUIDs the user controls will not affect the architecture. The important thing is that the user will be able to use the device 170 for only specific PUIDs. The device 170 must get the list of PUIDs allowed to the user. The PUID information enabler 176 will allow the device 170 to get this list. This enabler will be able to supply information about the use of PUIDs. In this case, it would supply all the PUIDs associated with the user. The device 170 enforces that the user may register only allowed PUIDs. For example, this may be done with a restrictive pull-down menu of PUIDs or by checking the registration message before sending it. How this is done is a user interface issue and may be flexibly implemented. The PUID to be registered goes into the "To header" of the REGISTER message.

The second piece of information needed for the registration is the network address of the registration. The user should be able to enter any network address. Aliases for the network address are supported to make it easier. Once the device 170 has discovered the P-CSCF 150A, 150B, as discussed above, there will be enough information for a basic registration. Advanced users should be able to override default values for priority, expiration and capabilities within prescribed limits.

In addition to its ability to perform proxy registrations, enabling event-based, time-based and web-based registrations, the device 170 is a logical place to provide other advanced registration services to customers concerning network registration. Its ability to run registrations and de-registrations from any piece of equipment can be combined with an ability to monitor all registrations to provide some valuable services.

The restriction that all REGISTER messages must come directly from the piece of equipment that is being registered or de-registered is burdensome in the IMS system. The fact that the registration is done at the network address in the contact header rather than the origin address in the message opens the possibility of addressing this restriction. As easy a concept as a move (registering on a new device and de-registering from an old device) would have to be done with two separate messages originating from two different devices. The device 170 performs this and other macros concerning registration with a single interaction from a single point to the device 170. This concept is used to implement the three screen strategy. For example, a customer may be watching an event on a home TV set and have to leave for an appointment. In order to continue watching the event, the customer may want to transfer the video to a portable device capable of rendering the video such as a cell phone. In addition to moving the content, the customer may want to change the registration to the cell phone and de-register from the home TV. To do this as part of one action by the customer, the device 170 would be used so that separate action from the TV and cell phone are not necessary.

A customer might find it easier to maintain its registrations with the concept of registration states. The customer could define registration states which would include which of the customer's PUIDs are registered where. The state could be given a name such as "normal workday", "normal weekend," or "business trip to home office." An example of a "night registration" state was given above as a state that could be initiated automatically by time of day. It would be valuable to customers if a single menu item or button instructed the network to put the customer in that state.

For the device 170 to allow the customer to do this, in addition to the capability to register the customer on any device, the device 170 would have to keep track of where the customer was registered in order to know where to de-register the customer.

Not all registrations would go through the device 170. Registrations could also be done in the current standard manner, registering directly from the device at power on. To track these registrations, the device 170 would have to act as an Application Server that subscribed to the registration event or which gets a third party registration. Having done this, it would be able to track the registrations giving it the ability to know what to de-register when a customer chooses to enter a registration state. Confirmations could be required or not required for the de-registrations. The customer should be able to decide.

The device 170 needs to track all registration in order to be able to work with requested defined registration states. This information about exactly where the customer is currently registered could be useful to a customer who wants to verify his current registration state, perhaps for the purposes of taking corrective action. This information in the device 170 could be made available to the customer over a web interface. This allows for registration review. This information could also be made available to Application Servers. Either the device 170 would act as an enabler or it could provide the information to an enabler. It could also be of use to a customer service representative trying to troubleshoot a problem.

Another aspect relates to providing registration alerts. The power to control one's registrations gives the customer the power to make mistakes that will adversely affect the service that they receive. In addition to giving them the ability to review their current registration state, the customer may want to define certain states about which an alert or notification is requested. Network providers may want to automatically alert the customer about certain states. For example, a customer may want daily notifications when none of his PUIDs are registered on any of the equipment which belongs to him. Another customer may want notification when his work PUID is registered at home during normal work hours. Another may want notification when any of her PUIDs are registered on equipment not belonging to her for more than an hour. The customer should be given the capability to define the situations in which she wants to be alerted. The device 170 detects those situations and alerts the customer. Alerts could be defined that use calls, email, instant messaging or any other appropriate communication mechanisms.

There are several interfaces to the device 170. First there is a web interface. This is usually used by user equipment or by a telecommunications portal. The user may either actively give the information needed for the registration or can rely on pre-populated scripts chosen from menus, buttons, or other interface means. The telecommunications portal is one application for which an interface to the device 170 to initiate registrations is recommended because of its direct user involvement. Registrations by other applications servers would be possible by the architecture.

Another source of initiating registrations is the notification of events from the enablers 176 such as the location enabler. The device 170 would subscribe to specific events and get notifications when they occurred. Any enabler capable of sending notifications could be used.

Enablers are also used for authentication of the user or the user's device that requests registrations over the web interface. The identity management enabler 176 could be used. If the device used were an IMS device with a UICC, the Generic Bootstrapping Architecture (GBA) could be used for authentication.

The device 170 would need credentials for each user that it could register in order to partake in the basic IMS registration process, which is preferably not changed. These credentials would either be provisioned on the device 170 or made available over an interface not shown.

The other interface to enablers would be to the notification enabler 176 allowing the device 170 to notify the user when the registration state meets user-defined criteria.

Inward to the P-CSCF 150A, 150B, S-CSCF 158 and HSS 160, the device 170 would look like a user. Therefore, there would be no need for changes to the S-CSCF 158 and HSS 160. The same interfaces would be supported. The device 170 may need to talk to the P-CSCF 150A, 150B and the user equipment 152, 153 in enhanced ways to allow the setting up of a tunnel between them, where appropriate, tied to the registration. Normal registration from user equipment 152, 153 using the standard IMS defined process is supported.

Other aspects of the present invention provide for support for users on circuit switched networks. IMS standards do not define a method for giving IMS-based services to users on the PSTN or other circuit switched networks. The PSTN gateways allow users on the PSTN to initiate sessions to IMS users and allow IMS users to initiate sessions to PSTN customers, but getting IMS services while on the PSTN has not been defined.

Figure 6A:
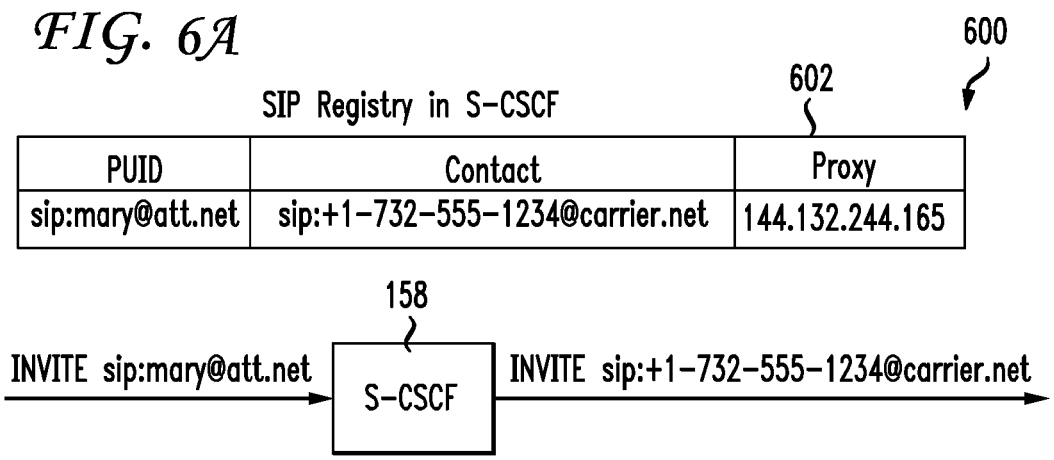
FIG. 6A illustrates an example of using a SIP registrar to send an invite message to another PSTN carrier.

This disclosure provides simple mechanisms that will allow the customer to get IMS services from any networked device capable of communicating to or receiving calls from the service provider's network. A customer will be able to get terminating services from the network delivered to any phone (hotel, in-laws, visitor office, bar, pay phone etc.) using the same registration method discussed for SIP devices. This is done with several changes. First, the contact header of the REGISTER message and the information in the SIP Registrar function will support SIP URIs that translate to E.164 addresses, not just IP addresses. Since these fields already support SIP URIs, no change is anticipated in standard equipment. The BGCF 125 already knows how to send a SIP call to the PSTN. Some changes are made to process these calls. FIG. 6A shows how the SIP Registrar 600 can be used to send calls to the PSTN after terminating services are applied, even to E.164 numbers on another network.

FIG. 6A illustrates using the SIP Registrar as part of the S-CSCF 158 to send INVITE to another PSTN carrier.

By registering the PUID sip:mary att.net at an E.164 address on another carrier's network, the S-CSCF 158 will first process the Service Profile associated with the PUID and then send it to the BGCF 125 to be delivered to the other network. No changes are needed to the terminating S-CSCF 158. The BGCF 125 does not need any additional functionality as long as it can accept INVITES from an S-CSCF 158. An alternative approach uses the MGCF as the place where the S-CSCF sends the calls.

Figure 6B:
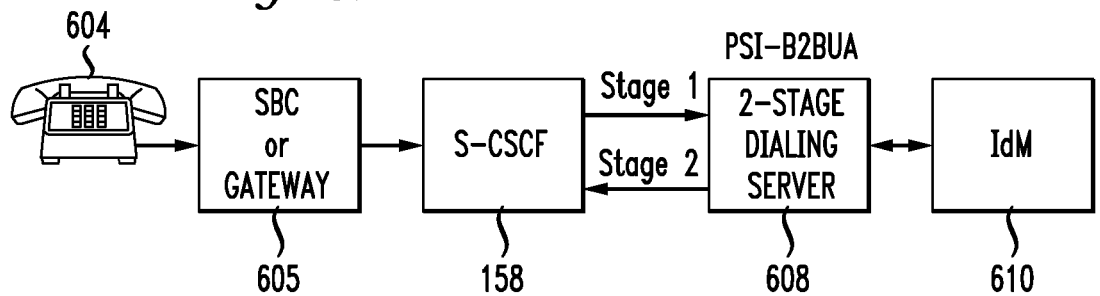
FIG. 6B illustrates a two-stage dialing server.

The proposed solution for originating calls from a PSTN phone on any carrier's network is a two stage dialing approach. This is illustrated in FIG. 6B. The user, from any phone 604 (or device 152, 153), would dial a phone number representing the two-stage dialing server through a gateway 605. This is similar to the use of credit card calls and for carrier bypass. Essentially, the server 608 is addressed by a phone number that translates to a SIP public service identity or PSI. The 2-Stage dialing server 608 then authenticates the user, with the help of the identity management enabler 610, and gives the user a choice of which PUIDs to use as the originating party (P_Asserted_Identity). This will allow the user to get any network originating services on the session. To determine the called party DTMF or voice recognition could be used to either designate a TEL URI or to make a choice from the caller's address book using that enabler. Such an approach could be used from any phone capable of calling a party on the network, including an Airfone FIG. 6B shows how the 2-Stage dialing server 608 relates to the S-CSCF 158 (or an I-CSCF) over an ISC interface as a PSI. As a PSI, it acts as a terminating user agent. It then uses the identity management enabler 610 to authenticate the user and acts like a Back-to-Back user agent sending a new INVITE to the S-CSCF 158. The S-CSCF 158 to which it sends the new INVITE may be a different S-CSCF 158, because the S-CSCF 158 that sent the INVITE to it was chosen based on the URI of the 2-Stage dialing server 608, not the PUID of the user.

These two methods, allowing registration at E.164 addresses on the PSTN and two stage dialing extend service mobility to all phones that can reach or be reached by the network.

FIG. 12 illustrates a method embodiment of the invention. The method provides for registering users of non-IP or non-IMS devices in an IMS using a network-based device such as an S-CSCF. The method relates to operating a network-based device in an IMS and includes receiving a request for receiving a request for a registration action to change an IMS registration state associated with a contact location of the registration state, the request being received from a device different from the contact location of the IMS registration state (1202) and communicating data to and from the different device to implement the change in the IMS registration state (1204). Changing the IMS registration state may further include changing at least one state parameter in a SIP user agent, a P-CSCF, an S-CSCF and/or an HSS. The registration state may be a registration or a de-registration. The request for a registration may be initiated based on a number of factors. For example, the request may be initiated based on a time of day identified from a network node or outside source of data, it may be based on a change in the location of a user which may be identified by any source such as a GPS, cellular network, and so forth, it may be initiated by a message of a changed state associated with a user. For example, one state may indicate that the user isn't home and when the user moves or arrives at work or in a vehicle that may be a changed state that initiates a registration action. The registration action may be initiated by a message of a changed state that is associated with the IMS. The request may be initiated by an interaction with the user. For example, the user may have a finger print sensitive mechanism on various devices at home and at work and therefore, when the user picks up a telephone or a mouse or interacts with a device in one location or another, that may initiated a request for a registration on that device. Furthermore, the interaction from a user may be remote. For example, the user may log in from a device that is remote from a registered device and request or initiate a registration action associated with one or more devices.

The system may also receive requests for registration action initiated by a customer service agent. For example, a user may forget to de-register from a home device and call a service center which may have a customer service agent that can then initiate remotely a de-registration and manipulate other registrations as well on behalf of a consumer. The registration action may further comprise registering or de-registering a user at a device based on a detected location of the user as set forth above. The registration action may further include modifying an ability of a network to receive calls from one or more user devices modifying an ability of a network to receive calls from one or more user devices and transmit calls from third parties to a user's one or more devices based on the implemented registration action. If the registration action results in multiple concurrent registered devices associated with the PUID, then the method may further include forwarding incoming calls to each device at which the user is registered. In one aspect, the implemented change in the IMS registration state is performed transparent to a user. This may occur, for example, if the registration actions are purely location based where a user essentially does not interact with the system other than the system detecting that the user has arrived at work or at home or at some other location and automatically altered the user registration state according to a predefined policy.

FIG. 13 illustrates another method embodiment that relates to providing registration macros in an IP multimedia subsystem. The method of operating an network device in an IMS includes receiving an instruction from a user regarding a plurality of registration changes of customer equipment (1302) and implementing a macro such that the first step comprising at least one of a registration or a de-registration and a second step comprising one of a registration or a de-registration both occur based on the instruction from the user (1304). The instruction may be received from a device associated with the first or the second step shown in FIG. 13. The instruction may be received from a device that is not associated with the first or second step and implementing the macro may comprise using a contact header in an IMS protocol. An example of typical use of this embodiment of the invention would be where a user moves from a home phone to a cell phone and a single command from a cell phone for all new sessions may be sent as an instruction regarding a plurality of registration changes to customer equipment. This aspect of the invention requires there to be multiple changes to the registration state based on the single command and such a change is accomplished using a macro.

Another embodiment of the invention is illustrated in FIG. 14 which demonstrates a method of remotely de-registering devices in an IP multimedia subsystem (IMS). As disclosed in FIG. 14, a method of operating an IP device in an IMS includes receiving instructions for a de-registration action for a Public User ID (PUID) registered at a device in the IMS, the instruction being initiated remotely from the registered device 1402 and performing the de-registration action wherein the PUID is de-registered from the device in the IMS network (1404). Performing the de-registration may further comprise allowing the registration at the device to expire or may occur by transmitting a new registration instruction to the registered device that causes the registration to be cancelled. Transmitting the new registration may comprise transmitting a registration for zero seconds. The instruction may be initiated from a mobile device associated with the user that differs from the device at which the PUID is registered. Furthermore, the instruction may also be initiated from a non-mobile device that is also associated with the user but differs from the device at which the PUID is registered. The instruction may also be initiated based on one of a predetermined event and/or input from a user at a device remote from device at which the PUID is registered.

FIG. 15 illustrates another method embodiment of the invention related to providing the user with a registration review in an IP multimedia subsystem (IMS). As shown in FIG. 15, a method of operating a device in an IP multimedia subsystem includes tracking and storing all current registration (1502), receiving a request for a user for a status of the user's current registrations (1504), and presenting, in response to the request, the current status of current registrations for the user (1506). The method may further comprise receiving an instruction from the user to take an action relative to the user's current registrations (1508) and based on the instruction, taking the action to modify at least one aspect of the user's current registrations (1510). These are optional steps.

The method may also further comprise receiving a request from a customer service agent for the status of the user's current registrations and presenting to the customer service agent the current status of current registrations for the user. The method may also involve receiving an instruction from the customer service agent to take an action relative to the user's current registration and based on the instructions, taking the action to modify at least one aspect of the user's current registrations or registration state. The request may be received from a remote device that is not registered to the user in the IMS. If this is the case, another aspect of the invention may involve presenting to that remote device the current status of the current registrations for the user. The request from the user may further include a request from a device at which the user is registered.

FIG. 16 illustrates another embodiment of the invention related to providing registration alerts in an IMS system. A first step can involve defining an event such as a customer or a CSR. As shown in FIG. 16, the method embodiment operating a network-based device in an IMS system includes detecting a predetermined event (or previously defined event)

associated with a registration state associated with all of a user's registrations in the IMS (1602) and transmitting a notification to a user which reports the occurrence of the predetermined event (1604). Transmitting the notification may further comprise transmitting the notification via at least one of a call, email, instant message or multimedia message. The user may interact with the notification transmitted to the user to indicate a change in the registration date by either adding or deleting a registration. The method may optionally include taking an action relative to the user's registration state in the IMS system based on the user interaction with the notification (1606). The predetermined event can be one or more of a user defined event, a timeframe associated with the registration state, a change in the registration state, or may be associated with the non-occurrence of an expected event that is alter the registration state or it may be associated with a location of the device. One example of this approach may be wherein the system can notify the user when one of the user's PUIDs is registered at a home for more than 15 hours. In this case, the user may travel quite a bit and forget to change registration for devices at their home. In this case, the predetermined event is based on time and when the event lapses without the user de-registering from a certain location, the system will transmit a notification to the user of this event and enable the user to provide changes to the registration state in some manner. Another example use of this aspect of the invention is to notify the user if she is registered at her home and cell phone but the cell phone is not at the home. In other words, there may be any number of changes either in location of devices, change in the user, or time related changes or events that may trigger, as a predetermined event, a change in a registration state or indicate a need for a change in the registration state in IMS.

Figure 17A:
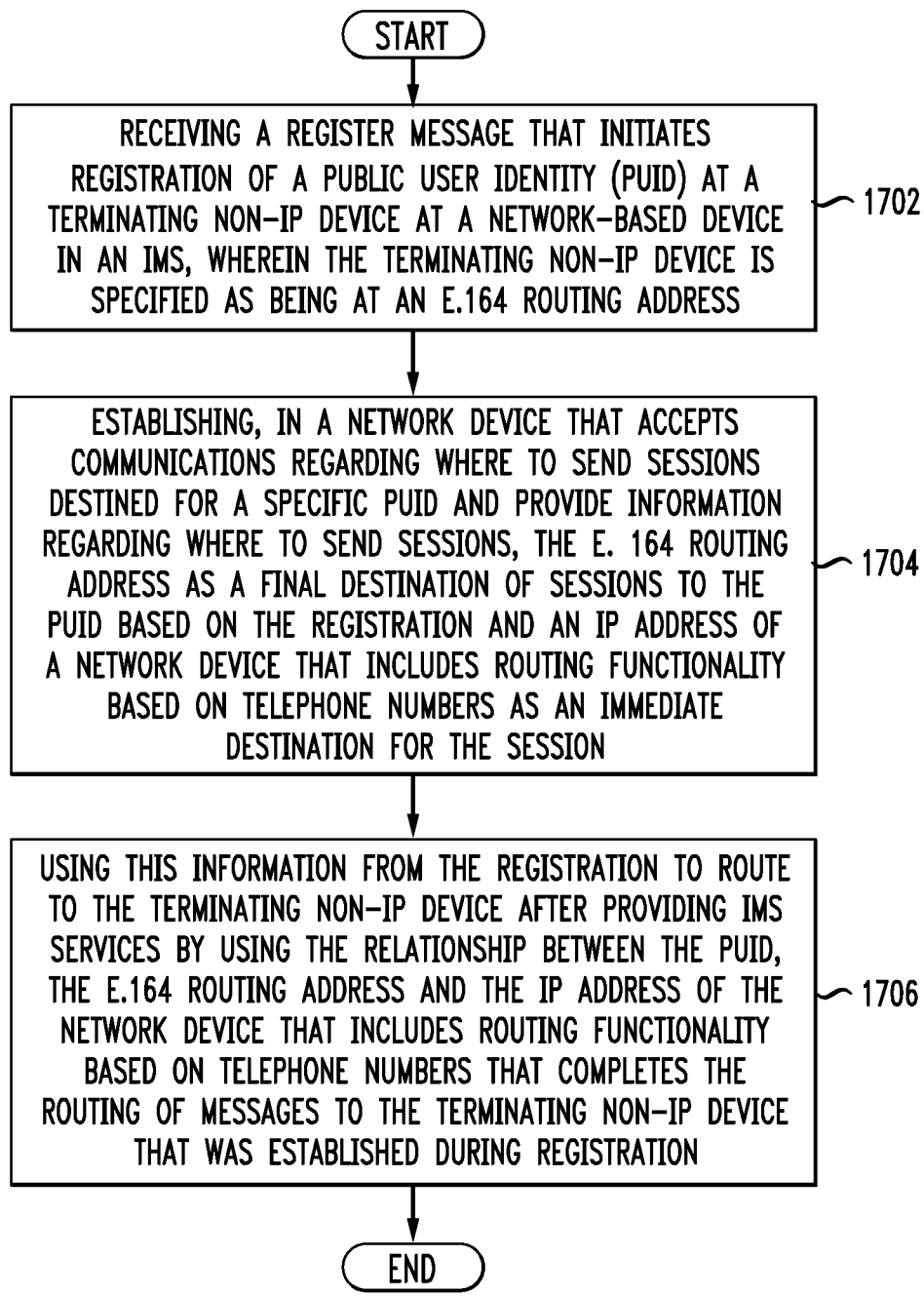
FIG. 17A illustrates a method of providing registration and service mobility to terminating non-IP devices.

FIG. 17A illustrates yet another embodiment of the invention related to a method of terminating non-IP or non-IMS devices and providing registration and service mobility to such terminating non-IP devices. As shown in FIG. 17A, the method relates to operating an IMS or a network device in an IMS to provide IMS services to terminating non-IP devices. The method includes receiving a REGISTER message that initiates registration of a Public User Identity (PUID) at a terminating non-IP device at a network-based device in an IMS, wherein the terminating non-IP device is specified as being at an E.164 routing address (1702), establishing, in a network device that accepts communications regarding where to send sessions destined for a specific PUID and provide information regarding where to send sessions, the E.164 routing address as a final destination of sessions to the PUID based on the registration and an IP address of a network device that includes routing functionality based on telephone numbers as an immediate destination for the session (1704) and using this information from the registration to route to the terminating non-IP device after providing IMS services by using the relationship between the PUID, the E.164 routing address and the IP address of the network device that includes routing functionality based on telephone numbers that completes the routing of messages to the terminating non-IP device that was established during registration (1706).

The network device that accepts communications regarding where to send sessions to send sessions destined for a specific PUID and provide information regarding where to send sessions may be an S-CSCF with its SIP Registrar function. Establishing in the SIP Registrar that the E.164 routing address is the final destination may be accomplished by placing a registration result in the SIP Registrar's record in the same place that an IP address of an IP final destination would be placed. A call session control function may use its SIP Registrar capabilities to route a call to a PUID registered at an E.164 routing address as the final destination. This may be accomplished by placing a SIP URI or TEL URI representing the E.164 routing address in an indication of a final destination PUID or address of the message being processed and the SIP URI representing the network device that includes routing functionality based on telephone numbers in a portion of the message that indicates its immediate destination. The indication of the final destination PUID or address may be a Request URI. The portion of the message that indicates it immediate destination may be a route header. The network device that includes routing functionality based on telephone numbers may be the Breakout Gateway Central Function (BGCF) node in an IMS system. The step of providing IMS services to the terminating non-IP device may occur via the network device that includes routing functionality based on telephone numbers sending messages through at least one of a media gateway control function (MGCF) and/or a Signaling Gateway (SGW) to the terminating non-IP device. The non-IP device may be associated with a PSTN or a circuit switched voice connection in a wireless or cellular network. Such a wireless or cellular network may include the use of various protocols such as GSM, UMTS, CDMA or CDMA2000 networks. The wireless or cellular network does not necessarily need to support IP data.

FIG. 17B illustrates another embodiment of operating an IMS to provide IMS services to terminating non-IP devices. This method includes receiving a REGISTER message that initiates registration of a Public User Identity (PUID) at a terminating non-IP device at a network-based device that processes a call session, wherein the terminating non-IP device is specified as being at a contact address that is an E.164 routing address (1710), establishing, in a network device that accepts communications regarding where to send sessions destined for a specific PUID and provide information regarding where to send sessions, the E.164 routing address as a final destination of sessions to the PUID based on a communication with a network device that includes routing functionality based on telephone numbers as an immediate destination for the session to recognize that the registered contact address is an E.164 address (1712) and using this information from the registration to route to the terminating non-IP device after providing IMS services by using the relationship between the PUID and the E.164 routing address to complete the routing of messages to the terminating non-IP device that was established during registration (1714). According to an aspect of this embodiment, the network-based device that processes the call may be an S-CSCF. The registered contact address may be associated with a SIP URI or a TEL URI.

Figure 18:
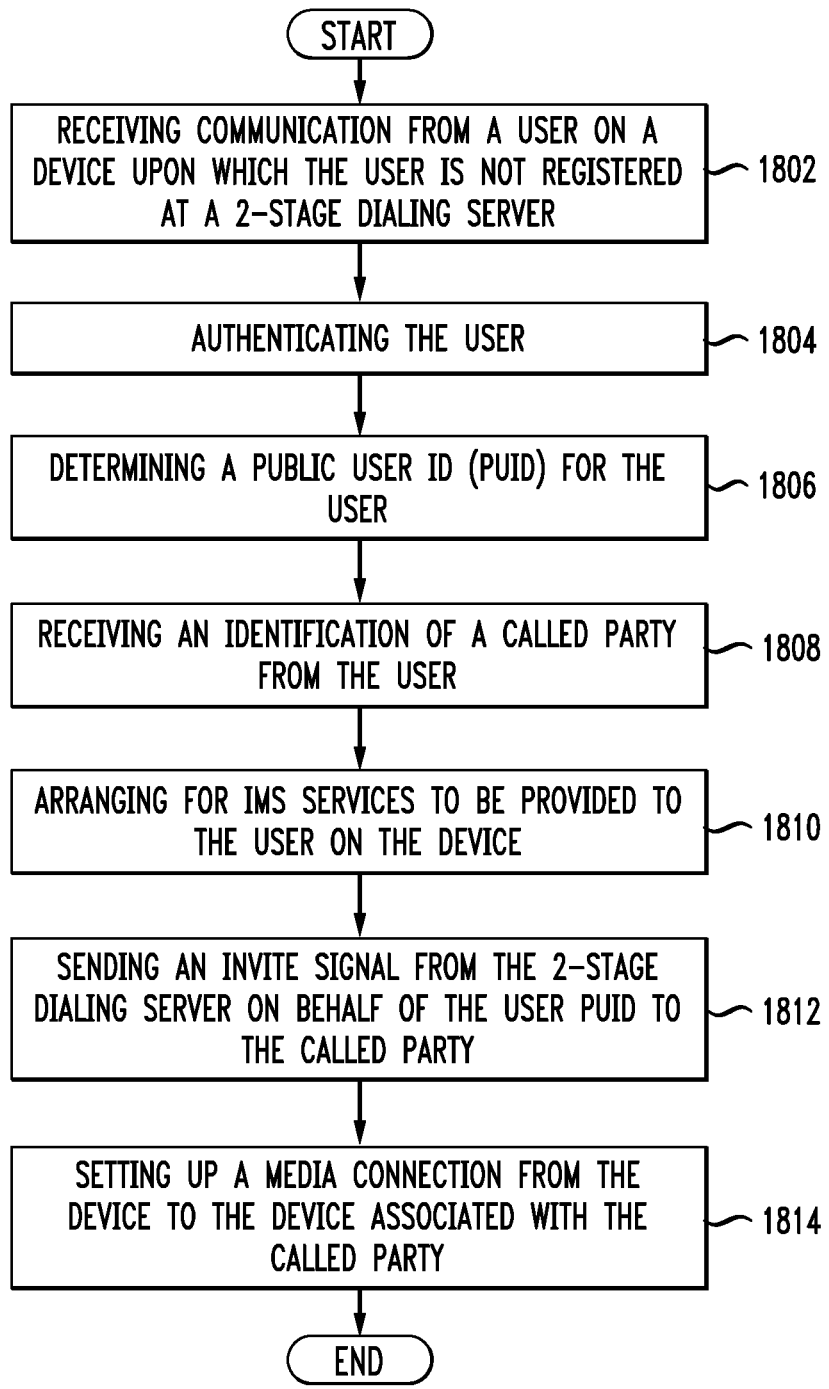
FIG. 18 illustrates a method of providing IMS registration and service mobility for originating non-IP devices.

FIG. 18 illustrates a method embodiment of the invention for providing IMS services to users on originating non-IP devices and other devices that do not have a previous association with the user. As shown in FIG. 18, the method of operating an IMS to provide IMS services includes receiving communication from a user on a device upon which the user is not registered at a 2-stage dialing server (1802), or any other server that performs a similar functionality, authenticating the user (1804), determining a Public User ID (PUID) for the user (1806), receiving an identification of a called party from the user (1808), arranging for IMS services to be provided to the user on the device (1810), sending an INVITE signal from the 2-stage dialing server, or any other server that performs a similar functionality, on behalf of the user PUID to the called party (1812), and setting up a media connection from the device to the device associated with the called party (1814). Determining the PUID may further include determining whether there is one or more allowed PUIDs for the user, and if there are more than on PUID, then the method includes engaging in a dialog with the user to present the more than one user PUID and receiving a selection of a chosen PUID for the session. Receiving the communication from the user at the 2-stage dialog server may further include receiving an addressing signal of a phone number or a SIP Public Service Identity (PSI) or a SIP Public User Identity (PUID). Determining a PUID for the user may further include communicating via a Sh interface with a Home Subsystem Service (HSS). Arranging for IMS service to be provided to the user may further include registering the PUID of the user at the device. Receiving an identification of a called party from the user may further include communication with a personal address database associated with the user. In this regard, the system enables the user to easily tap into current personal address databases and retrieve easily information associated with a call party for easy dialing. User identity credentials may be provided in alternate methods known to those of skill in the art such as using a name password or voice tone or window interaction. Users may input data via voice, text, DTMF or other mechanisms know to those of skill in the art. When the two-stage dialing server arranges for the network to allow service for the session, there may be various methods for accomplishing this. For example, disclosed herein are methods for registering using a network-based device such as registration manager covered in various disclosures found herein.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

The invention claimed is:

1. A method comprising: receiving an instruction automatically generated in response to detecting a location based event, the location based event being independent of user input, the instruction providing a plurality of registration changes of customer equipment, wherein the customer equipment comprises a first communication device and a second communication device; implementing, based on the instruction, a macro to assign internet protocol subsystem services associated with a single user to the first communication device and the second communication device, the macro performing: assigning a first E.164 routing address to the first communication device and assigning a second E.164 routing address to the second communication device, wherein the first E.164 routing address is distinct from the second E.164 routing address; wherein the first E.164 routing address of the first communication device comprises at least one registered public user identity of a plurality of public user identities of the single user and the second E.164 routing address of the second communication device comprises the at least one registered public user identity of the plurality of public user identities of the single user and wherein a same serving call/session control function is used and established until the last registered public user identity has been de-registered from the first E.164 routing address of the first communication device and the second E.164 routing address of the second communication device; and routing a communication to at least one of the first communication device and the second communication device based on a classification of an originator of the communication, wherein the classification is defined by the single user.

2. The method of claim 1, wherein the routing of the communication to at least one of the first communication device and the second communication device comprises performing the routing to the first communication device and the second communication device in parallel.

3. The method of claim 1, wherein the routing of the communication to at least one of the first communication device and the second communication device comprises performing the routing to the first communication device and the second communication device in a sequential order.

4. The method of claim 1, wherein the routing of the communication to at least one of the first communication device and the second communication device comprises performing the routing to the first communication device and the second communication device using a combination of parallel and sequential ordering.

5. A system comprising: a processor; and a computer-readable storage medium having instructions stored which, when executed by the processor, cause the processor to perform operations comprising: receiving an instruction automatically generated in response to detecting a location based event, the location based event being independent of user input, the single instruction providing a plurality of registration changes of customer equipment, wherein the customer equipment comprises a first communication device and a second communication device; implementing, based on the instruction, a macro to assign internet protocol subsystem services associated with a single user to the-first communication device and the second communication device, the macro performing: assigning a first E.164 routing address to the first communication device and assigning a second E.164 routing address to the second communication device, wherein the first E.164 routing address is distinct from the second E.164 routing address; wherein the first E.164 routing address of the first communication device comprises at least one registered public user identity of a plurality of public user identities of the single user and the second E.164 routing address of the second communication device comprises the at least one registered public user identity of the plurality of public user identities of the single user and wherein a same serving call/session control function is used and established until the last registered public user identity has been de-registered from the first E.164 routing address of the first communication device and the second E.164 routing address of the second communication device; routing a communication to at least one of the first communication device and the second communication device based on a classification of an originator of the communication, wherein the classification is defined by the single user.

6. The method of claim 1, wherein the location based event comprises arriving at one of home and work.

7. The method of claim 1, wherein the location based event comprises leaving one of home and work.

8. The method of claim 1, wherein the assigning of the first E.164 routing address to the first communication device and the assigning of the second E.164 routing address to the second communication device further comprise establishing a time at which the first E.164 routing address and the second E.164 routing address will be de-registered from the first communication device and the second communication device.

9. The system of claim 5, wherein the routing of the communication to at least one of the first communication device and the second communication device comprises performing the routing to the first communication device and the second communication device in parallel.

10. The system of claim 5, wherein the routing of the communication to at least one of the first communication device and the second communication device comprises performing the routing to the first communication device and the second communication device in a sequential order.

11. The system of claim 5, wherein the routing of the communication to at least one of the first communication device and the second communication device comprises performing the routing to the first communication device and the second communication device using a combination of parallel and sequential ordering.

12. A computer-readable storage device having instructions stored which, when executed by a computing device, cause the computing device to perform operations comprising: receiving an instruction automatically generated in response to detecting a location based event, the location based event being independent of user input, the instruction providing a plurality of registration changes of customer equipment, wherein the customer equipment comprises a first communication device and a second communication device; implementing, based on the instruction, a macro to assign internet protocol subsystem services associated with a single user to the first communication device and the second communication device, the macro performing: assigning a first E.164 routing address to the first communication device and assigning a second E.164 routing address to the second communication device, wherein the first E.164 routing address is distinct from the second E.164 routing address; wherein the first E.164 routing address of the first communication device comprises at least one registered public user identity of a plurality of public user identities of the single user and the second E.164 routing address of the second communication device comprises the at least one registered public user identity of the plurality of public user identities of the single user and wherein a same serving call/session control function is used and established until the last registered public user identity has been de-registered from the first E.164 routing address of the first communication device and the second E.164 routing address of the second communication device; routing a communication to at least one of the first communication device and the second communication device based on a classification of an originator of the communication, wherein the classification is defined by the single user.

13. The computer-readable storage device of claim 12, wherein the routing of the communication to at least one of the first communication device and the second communication device comprises performing the routing to the first communication device and the second communication device in parallel.

14. The computer-readable storage device of claim 12, wherein the routing of the communication to at least one of the first communication device and the second communication device comprises performing the routing to the first communication device and the second communication device in a sequential order.

15. The computer-readable storage device of claim 12, wherein the routing of the communication to at least one of the first communication device and the second communication device comprises performing the routing to the first communication device and the second communication device using a combination of parallel and sequential ordering.

16. The method of claim 1, wherein the user has established different service profiles for communicating with different groups of people.

17. The method of claim 1, further comprising:
assigning the internet protocol subsystem services associated with the single user to a third communication device previously unassociated with the single user.

18. The method of claim 3, wherein the sequential order is determined by a priority of registration.

19. The method of claim 18, wherein the priority of registration is established by a tag in a contact header of a SIP HEADER message.

20. The method of claim 2, further comprising:
receiving an acceptance of the communication from an accepting device, to yield the accepting device and not-accepting device; and sending a cancellation message to the not-accepting device.

* * * * *